US009773089B2

(12) United States Patent
Lee et al.

(10) Patent No.: US 9,773,089 B2
(45) Date of Patent: Sep. 26, 2017

(54) INTEGRATED CIRCUIT DESIGN METHOD AND SYSTEM WITH COLOR-CODED COMPONENTS

(71) Applicant: TAIWAN SEMICONDUCTOR MANUFACTURING COMPANY, LTD., Hsinchu (TW)

(72) Inventors: Hui Yu Lee, Hsinchu (TW); Chi-Wen Chang, Yuanlin Township (TW); Yu-Tseng Hsien, Tongxiao Township (TW); Ya Yun Liu, Jhubei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 15/204,458

(22) Filed: Jul. 7, 2016

(65) Prior Publication Data

US 2016/0321392 A1    Nov. 3, 2016

Related U.S. Application Data

(63) Continuation of application No. 14/202,960, filed on Mar. 10, 2014, now Pat. No. 9,390,218.

(51) Int. Cl.
*G06F 17/50* (2006.01)

(52) U.S. Cl.
CPC ........ *G06F 17/5081* (2013.01); *G06F 17/505* (2013.01); *G06F 17/5068* (2013.01); *G06F 2217/74* (2013.01)

(58) Field of Classification Search
CPC ............ G06F 17/5081; G06F 2217/74; G06F 17/505; G06F 17/5068
See application file for complete search history.

(56) References Cited

U.S. PATENT DOCUMENTS

| | | | |
|---|---|---|---|
| 5,551,014 A * | 8/1996 | Yoshida | H01L 27/0207 716/102 |
| 8,252,489 B2 * | 8/2012 | Su | G06F 17/5036 382/144 |
| 8,448,120 B2 | 5/2013 | Huang | |
| 8,595,662 B1 * | 11/2013 | Yu | G06F 17/5068 716/110 |
| 8,701,055 B1 | 4/2014 | Lee | |
| 8,732,628 B1 | 5/2014 | Wu | |
| 8,745,552 B2 * | 6/2014 | Tseng | G06F 17/5081 716/50 |
| 8,751,975 B2 * | 6/2014 | Su | G06F 17/5068 430/30 |
| 8,762,897 B2 | 6/2014 | Chang | |

(Continued)

*Primary Examiner* — Naum B Levin
(74) *Attorney, Agent, or Firm* — Hauptman Ham, LLP

(57) ABSTRACT

A method includes generating a schematic of an integrated circuit (IC), the IC having a circuit component. The method also includes searching a database having one or more configurations of the circuit component, each of the one or more configurations of the circuit component having a corresponding estimated resistance capacitance (RC) value and an assigned color scheme based on the estimated RC value. The method further includes displaying the circuit component in the schematic as a symbol representing the circuit component, the symbol representing the circuit component being displayed having the assigned color scheme of a selected circuit component configuration.

20 Claims, 20 Drawing Sheets

(56) References Cited

U.S. PATENT DOCUMENTS

| | | |
|---|---|---|
| 8,769,452 B2 | 7/2014 | Buck |
| 8,782,570 B1 * | 7/2014 | Li ............................ G06F 17/50 |
| | | 716/51 |
| 8,806,414 B2 * | 8/2014 | Huang ................. G06F 17/5081 |
| | | 716/106 |
| 8,893,066 B2 | 11/2014 | Chen |
| 8,904,314 B1 | 12/2014 | Ho |
| 9,390,218 B2 * | 7/2016 | Lee ..................... G06F 17/5081 |
| 9,448,467 B2 * | 9/2016 | Chou ......................... G03F 1/00 |
| 2013/0094035 A1 | 4/2013 | Chang |
| 2014/0123086 A1 | 5/2014 | Buck |
| 2015/0121317 A1 | 4/2015 | Lee |

* cited by examiner

INTEGRATED CIRCUIT DESIGN METHOD AND SYSTEM WITH COLOR-CODED COMPONENTS

PRIORITY CLAIM

The present application is a continuation of U.S. application Ser. No. 14/202,960, filed Mar. 10, 2014, now U.S. Pat. No. 9,390,218, issued Jul. 12, 2016, which is incorporated herein by reference in its entirety.

BACKGROUND

Device manufacturers are challenged to deliver value and convenience to consumers by, for example, providing integrated circuits that offer quality performance. The recent trend in miniaturizing integrated circuits (ICs) has resulted in smaller devices that consume less power, yet provide more functionality at higher speeds. The miniaturization process has also resulted in stricter design and manufacturing tolerances. Pre-manufacture checking and testing are performed to make sure that a semiconductor device can be made and will function as designed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
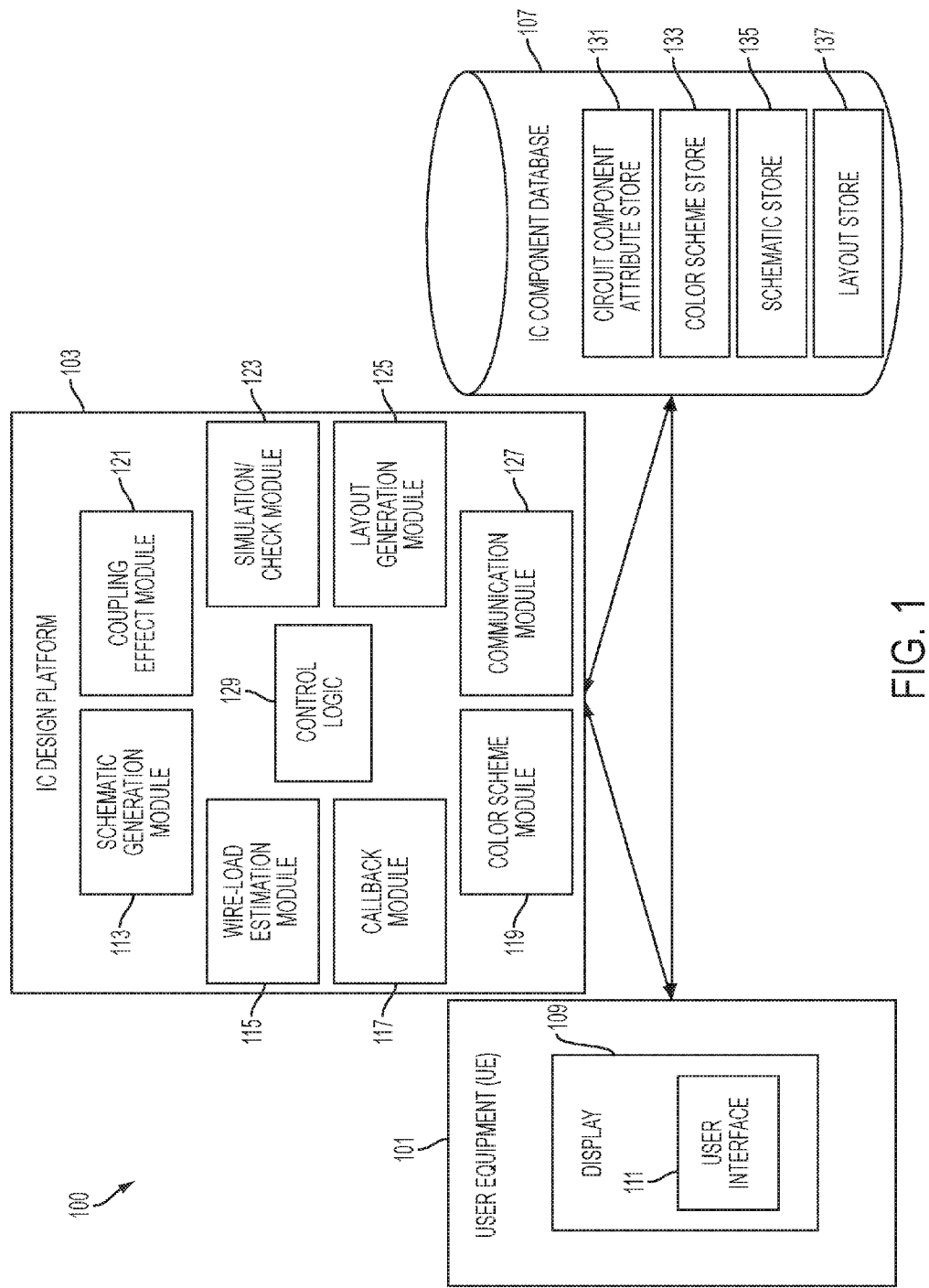
FIG. 1 is a diagram of an integrated circuit design system, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Techniques have been developed to represent integrated circuit designs at various levels of abstraction. According to these techniques, a designed integrated circuit is capable of being represented as a schematic or as a layout. A schematic is an electronic diagram of a designed integrated circuit. Schematic diagrams often include symbols that represent circuit components such as transistors, resistors, capacitors, or other circuit components. Schematic diagrams also often include representations of the connections between the circuit components included in the schematic. A layout is a representation of an integrated circuit in terms of planar geometric shapes that correspond to the patterns of materials such as metal, oxide, or semiconductor layers that make up the components of the integrated circuit.

The circuit components included in the schematic are commonly known as instances. The connections between the circuit components, or "wires" between the circuit components, are commonly known as nets. Schematic netlists are lists that include an inventory of the circuit components (i.e., instances) included in the schematic, and describe the circuit components and included attributes or properties of these circuit components. Schematic netlists also include an inventory of the connections between the circuit components (i.e., nets). Schematic netlists are sometimes stored as netlist files in databases accessible by electronic design automation (EDA) tools.

Integrated circuit designers often rapidly design and verify circuits, with extensive use of standard, reusable components and design flows. EDA tools allow designers to develop an integrated circuit design at the schematic level and verify performance at the schematic via a pre-layout simulation. If the pre-layout simulation demonstrates that the integrated circuit design at the schematic level meets specified performance characteristics, EDA tools generate a layout and perform verification tasks such as design rule checks (DRC) and layout versus schematic (LVS) checks. Design rule checks compare the layout to a set of design rules that satisfy a series of recommended parameters set forth by an integrated circuit manufacturer to ensure that a manufactured integrated circuit functions properly. Design rule sets specify certain geometric and connectivity restrictions to ensure sufficient margins to account for variability in the manufacturing process. LVS checks are often performed after the DRC is complete. EDA tools often perform LVS checks by extracting the circuit components and the connections between the circuit components and generating a layout netlist. The EDA tool then compares the layout netlist to the schematic netlist. If the layout netlist and the schematic netlist match within a specified tolerance or are identical, then the layout is "LVS clean."

After the layout passes the DRC and is "LVS clean," EDA tools often run a post-layout simulation to estimate overall circuit performance which includes extracting resistance-capacitance (RC) values from the layout. EDA tools then often assign one or more color schemes to the various circuit components in the generated layout that represent the extracted RC values so that a designer is able to visually assess the RC values of the integrated circuit at the layout stage.

Extracted RC values are an important factor when assessing circuit performance, particularly when high precision and/or high-speed circuits are laid out. For a designed integrated circuit to reach the post-layout simulation stage, a designer often goes through numerous iterations of schematic design, pre-simulation, layout generation, DRC, and/or LVS checks only to learn at the post-layout stage that the designed integrated circuit has RC values that render the integrated circuit design undesirable. The designer then has to start over.

Some EDA tools make it possible for a designer to manually input estimated RC values for circuit components at the schematic generation stage based on experience or knowledge. Knowing RC values at the schematic generation stage helps a designer to estimate or control what the ultimate RC values for the integrated circuit design will be at the post-layout simulation stage. But, while manual entry may make it more likely that an integrated circuit design that makes it to the post-layout stage will have desirable RC values, designers find it difficult to keep track of the input RC values at the schematic generation stage. Designers also find it difficult to estimate the effect circuit components have on the RC values of other nearby circuit components. For example, the coupling effect between nearby circuit components often influences RC values, which degrades overall circuit performance. But, such effects are not usually known until the post-layout simulation stage, if at all, because designers have a difficult time compounding the coupling effect with manually input RC values at the schematic generation stage. Even further, designers often find it difficult to generate a layout that has the pre-defined input RC values that passes the DRC and LVS check. In addition to these difficulties, manually inputting RC values at the schematic generation stage is not only time consuming, but manual entry also provides an opportunity to introduce inaccuracies into the schematic that might not be discovered until the post-layout simulation stage. These difficulties and opportunities for error often result in a gap between the schematic and layout of the design integrated circuit, making the designer conduct multiple iterations of the design process from schematic to layout, which makes the integrated design process less efficient.

FIG. 1 is a diagram of an integrated circuit design system 100, in accordance with one or more embodiments.

Integrated circuit design system 100 makes it possible for a designer to visually assess estimated RC values of one or more components included in an integrated circuit design, including the effects some circuit components have on the estimated RC values of nearby circuit components, at the schematic generation stage. The integrated circuit design system 100 is accordingly configured to generate a color-coded schematic that includes symbols representing circuit components which are color-coded by assigned color schemes that represent estimated RC values. The assigned color schemes represent the estimated RC values of the circuit components alone, and/or as influenced by nearby circuit components. The estimated RC values are based on established known values or on calculations that estimate the RC values for the circuit components included in the integrated circuit design. The integrated circuit design system 100, therefore, makes it possible for a designer to easily follow the estimated RC values of the circuit components included in the integrated circuit design as the schematic is developed, and preliminarily assess whether the integrated circuit design will have a desirable RC value at the post-layout simulation stage. Further, to make generating the layout easier compared to conventional integrated circuit design systems, the integrated circuit design system 100 synchronizes the color scheme assigned to the symbols representing the circuit components in the schematic to the circuit components in the layout of the integrated circuit design such that the circuit components in the schematic and the layout have the same color scheme.

As shown in FIG. 1, the integrated circuit design system 100 comprises a user equipment (UE) 101 having connectivity to an integrated circuit (IC) design platform 103, and an IC component database 107.

The UE 101 is any type of mobile terminal, fixed terminal, or portable terminal including a desktop computer, laptop computer, notebook computer, netbook computer, tablet computer, wearable circuitry, mobile handset, or combination thereof. The UE 101 comprises a display 109 by which a user interface 111 is displayed. A user interacts with the IC design platform 103 using user interface 111 to design an IC, generate a schematic of the IC, simulate performance of the IC, and generate a layout of the IC.

IC design platform 103 is a set of computer readable instructions that, when executed by a processor, facilitates designing an IC, generates a schematic of the IC, conducts performance simulations of the IC, and generate a layout of the IC. The IC design platform 103 comprises a plurality of computing modules including a schematic generation module 113, a wire-load estimation module 115, a callback module 117, a color-scheme assignment module 119, a coupling effect module 121, a simulation/check module 123, a layout generation module 125, a communication module 127 by which the IC design platform 103 communicates with the UE 101 and the IC component database 107, and a control logic 129 that governs communications between the various modules of the IC design platform 103.

IC component database 107 is a memory capable of being queried by the IC design platform 103 based on a user interaction with the user interface 111. The IC component database comprises circuit component attribute store 131, a color scheme store 133, a schematic storage 135, and a layout storage 137.

The UE 101, IC design platform 103, and IC component database 107 are together configured as a special purpose computer system. In some embodiments, one or more of the UE 101, IC design platform 103, and IC component database are unitarily embodied in the UE 101. The UE 101, accordingly, comprises a processor by which the IC design platform 103 is executed. In some embodiments, one or more of the UE 101, IC design platform 103 and IC component database 107 are configured to be located remotely from the each other. If located remotely, the IC design platform 103 is executed by a processor that is also positioned remotely from the UE 101 such as another UE 101. By way of example, the UE 101, IC design platform 103, and IC component database 107 communicate by direct wired or wireless communication connection and/or one or more networks such as a wired data network, a wireless network, a telephony network, or combination thereof.

Based on one or more user interactions with the user interface 111, an IC is designed, and the IC design platform 103, by way of the schematic generation module 113, generates a schematic based on the designed IC. A designed IC, for example, has one or more circuit components. The one or more interactions with the user interface 111 include, for example, inputting one or more circuit component parameters such as length, width, spacing, material, location, estimated RC value, or other suitable descriptive parameter that describes a circuit component or any sub-components thereof. IC circuit components comprise, for example, resistors, transistors, wires, capacitors, switches, nodes, interconnects, vias, gates, sources, drains, doped regions, channels, or other suitable IC circuit components. The IC design platform 103, by way of the simulation/check module 123, optionally performs a pre-simulation of the generated schematic to determine the designed IC's potential performance capabilities, or at least the performance capabilities of at least one circuit component included in the designed IC.

Based on the input circuit component parameters, the IC design platform 103, by way of the communication module 127, searches the circuit component attribute store 131 for stored circuit components that identically match, or match within a predetermined threshold, therefore being similar to, those circuit components that are to be included in the designed IC. The IC design platform 103 also searches for various configurations, patterns or arrangements of the circuit components that are to be included in the designed IC. The IC design platform 103 causes the search results to be displayed to the user via the user interface 111 for selection and inclusion in the schematic generated by the schematic generation module 113. In addition to circuit components and circuit component configurations, the circuit component attribute store 131 also stores data associated with estimated RC values of the one or more circuit components and one or more configurations or patterns of the one or more circuit components, as well as other determinable circuit component performance factors such as allowable materials that are used when producing a circuit component, or associated masks used to produce a circuit component, for example.

The circuit component attribute store 131 is tied to the color scheme store 133. The color scheme store 133 includes data associated with a color scheme assigned to the one or more configurations of the one or more circuit components stored in the circuit component attribute store 131. The color scheme assigned to the one or more configurations of the one or more circuit components is based, at least in part, on the estimated RC value of the one or more configurations of the one or more circuit components. The estimated RC value of the one or more configurations of the one or more circuit components is based on the circuit component parameters and/or an estimated coupling effect that might occur between a circuit component and a nearby circuit component as one or more signals are transmitted through the circuit component and/or the nearby circuit component. The color scheme store 133 also includes data associated with how an assigned color scheme should change based on an estimated coupling effect or based on a newly calculated estimated RC value that differs from that which is stored in the circuit component attribute store 131.

At least one of the displayed circuit component configurations is selected by a user interaction with the user interface 111 for a corresponding circuit component that is to be included in the schematic as a symbol representing the selected circuit component. Based on the user selection, the schematic generation module 113 generates the schematic including the selected circuit component configuration. The schematic generation module 113 generates the schematic such that the symbolic representation of the selected circuit component is included in the schematic in accordance with the assigned color scheme as indicated in the color scheme store 135. Accordingly, the schematic generated by the schematic generation module 113 is a color-coded schematic. The IC design platform 103, by way of the communication module 127, causes the color-coded schematic of the designed IC to be displayed via the user interface 111.

The one or more circuit components in the designed IC are connected to interconnect wires. In some embodiments interconnect wires assume the estimated RC value of the circuit component to which the interconnect wire is connected. The color scheme module 119 is configured to assign a color scheme to an interconnect wire based on the color scheme of the circuit component to which the interconnect wire is attached. The color scheme module 119 assigns the color scheme to the interconnect wire such that the color scheme of the interconnect wire is the same as the color scheme of the circuit component to which the interconnect wire is connected. The schematic generation module 113 generates the schematic such that the symbolic representation of the interconnect wire is included in the schematic in accordance with the assigned color scheme.

In some embodiments, if the interconnect wire varies the assigned color scheme of the selected configuration of the circuit component to which the interconnect wire is connected, the color scheme module 119 changes the color scheme of the circuit component in the schematic in accordance with the affect that the interconnect wire has on the estimated RC value of the circuit component to which the interconnect wire is attached. The schematic generation module 113 generates the schematic such that the symbolic representation of the circuit component is in accordance with the updated color scheme as changed by the color scheme module 119. The interconnect wire also assumes the updated color scheme and is included in the schematic by the schematic generation module 113 as well.

In some embodiments, a circuit component comprises a plurality of sub-components that each have an assigned color scheme. An interconnect wire coupled to such a circuit component assumes a predominant color scheme between the plurality of sub-components and is displayed as such in the schematic generated by the schematic generation module 113.

The simulation/check module 123 performs a simulation of the schematic to conduct an electrical analysis of the circuit component included in the schematic to determine if the schematic passes a design rule check. If the schematic passes the design rule check, then the schematic generation module 113 extracts a schematic netlist that includes the description of circuit components and the interconnect wires included in the schematic having passed the design rule check. The IC design platform 103 then causes the schematic netlist to be stored in the schematic store 135. The schematic netlist also includes the estimated RC values and the assigned color schemes. The layout generation module 125 then generates a layout of the IC. The IC design platform 103 then causes the user interface 111 to display the generated layout of the IC. The displayed layout of the IC includes the selected configuration of the circuit component having the assigned color scheme that is reflected in the schematic following selection of the particular configuration of the circuit component that is to be included in the schematic. The assigned color schemes are synchronized with between the color-coded schematic and the layout based on estimated RC values and assigned color schemes that are stored in the schematic netlist. The callback module 117 implements a callback function configured to search the database 107 for the estimated RC values and the assigned color schemes and return the search results to the layout generation module 125 for inclusion in the generated layout.

The simulation/check module 123 then extracts a layout netlist of the circuit components and interconnect wires included in the layout of the designed IC and stores the layout netlist in the layout store 137. The simulation/check module conducts a LVS check comparing the layout netlist to the schematic netlist to determine if the layout and the schematic identically match, or match within a predetermined tolerance or threshold, or if there is a conflict between the layout and the schematic (i.e., the layout netlist and the schematic netlist do not identically match or match within the predetermined tolerance of threshold). If simulation/check module 123 determines there is a conflict between the layout and the schematic, or if the simulation/check module 123 determines that the schematic did not pass the design rule check, the IC design platform 103 causes the determined conflicting portion of the IC in the layout or in the schematic to be highlighted and/or remain uncolored in the layout or in the schematic, or does not generate the layout. In any case, the IC design platform 103 causes an instruction to be displayed by user interface 111 that the schematic should be corrected.

In some embodiments, the IC design platform 103 causes the database 107 to be generated based on user inputs with respect to various component parameters, expected RC values, manually assigned color schemes, and determinable trends that are based on one or more schematic simulations that take component parameters, estimated RC values, or other suitable design factors into consideration such as whether a particular schematic or configuration of a circuit component passed the design rule check and/or passed any determinable established constraint limitations that are stored in database 107.

In some embodiments, the IC design platform 103 is configured to determine a RC mismatch between a selected circuit component and a designated target circuit component. For example, a selected circuit component has a circuit component configuration which is designated as a source configuration and the target component has a target configuration. The source configuration and the target configuration have an estimated RC value. The estimated RC value of the source configuration and the target configuration are compared to one another to determine a RC mismatch degree or percentage. The estimated RC values of the source configuration and the target configuration are, for example, based on data stored in the circuit component attribute store 131.

In some embodiments, the estimated RC values for determining the RC mismatch degree, for one or both of the source configuration and the target configuration, is determined by inputting circuit component parameters into the wire load estimation module 115 instead of searching for stored estimated RC values. For example, circuit component parameters such as color patterns of various wires and arrangements are input into the wire load estimation module 115 either via a user input, or based on a selection of a circuit component in the schematic using user interface 111 for comparison to the designated target component. Geometry parameters such as width, length and spacing are also input into the wire load estimation module 115. Wire load estimation module 115 then calculates the estimated RC values for the input circuit component based on the input circuit component parameters.

In some embodiments, the wire load estimation module 115 causes the callback module 117 to search the database 107 using a callback function configured to search the database for estimated RC values that correspond to the input circuit component parameters. For example, some input component parameter might match a previously designed or simulated circuit component or circuit component configuration. The callback function is configured to find the circuit components or circuit component configurations that have attributes that match the input circuit component parameters and return estimated RC values for those circuit components or circuit component configurations discovered in the database 107 that match the input circuit component parameters. The wire load estimation module 115 then calculates the estimated RC value for the selected or input circuit component to be compared to the designated target configuration based on the returned estimated RC values.

The mismatch between the estimated RC values for the selected source configuration and the target configuration is determined based on equations (1) and (2) below.

$$R_{mismatch}(\%) = \frac{(R_{Comp100} - R_{Comp200})}{R_{Comp200}} \times 100 \tag{1}$$

$$C_{mismatch}(\%) = \frac{(C_{Comp100} - C_{Comp200})}{C_{Comp200}} \times 100 \tag{2}$$

In some embodiments, the IC design platform 103 causes the determined RC mismatch degree to be displayed via the user interface 111.

In some embodiments, the wire load estimation module 115 is configured to output analysis results that include values for one or more of a delta R, C, a timing delay, a rise time, a fall time, or a power analysis based on the determined RC mismatch between the selected circuit component and the designated target component. The IC design platform causes the analysis results to be displayed via user interface 111.

In some embodiments, the IC design platform 103, by way of the coupling effect module 121, is configured to estimate or simulate the coupling effect between a selected circuit component and one or more other circuit components included in the designed IC. The coupling effect alters the estimated RC value assigned to one or more configurations of the selected circuit component that is, for example, represented in the schematic of the designed IC. Accordingly, the coupling effect module 121 is configured to simulate the coupling effect and the color scheme module 119 is configured to adjust the assigned color scheme. If the assigned color scheme changes based a change in the estimated RC value, the schematic generation module 113 generates the schematic to include the updated color scheme and the IC design platform 103 causes the schematic having the updated color scheme that takes the coupling effect into consideration to be displayed by the user interface 111. In some embodiments, if the coupling effect causes the estimated RC value to change, the IC design platform 103 causes an updated textual estimated RC value of the selected circuit component to be displayed via user interface 111.

For example, if a signal is transmitted through a selected circuit component included in the designed IC, that signal might be affected by a signal transmitted through one or more other circuit components that are near the discussed circuit component. Such signals being transmitted through the nearby circuit components are either in-phase, out-of-phase, or in a steady state with the signal transmitted through the discussed circuit component. The coupling effect is simulated by assigning a coupling factor that is used to calculate the updated RC value of the selected circuit component based on the influence that the nearby one or more other circuit components have on the estimated RC value of the selected circuit component. In some embodiments, the estimated RC value of the selected circuit component for any combination of possible coupling factors is displayed in a color-coded look-up table for quick reference via the user interface 111. In some embodiments, the coupling factor is assigned based on a user input received by way of the user interface 111.

Figure 2:
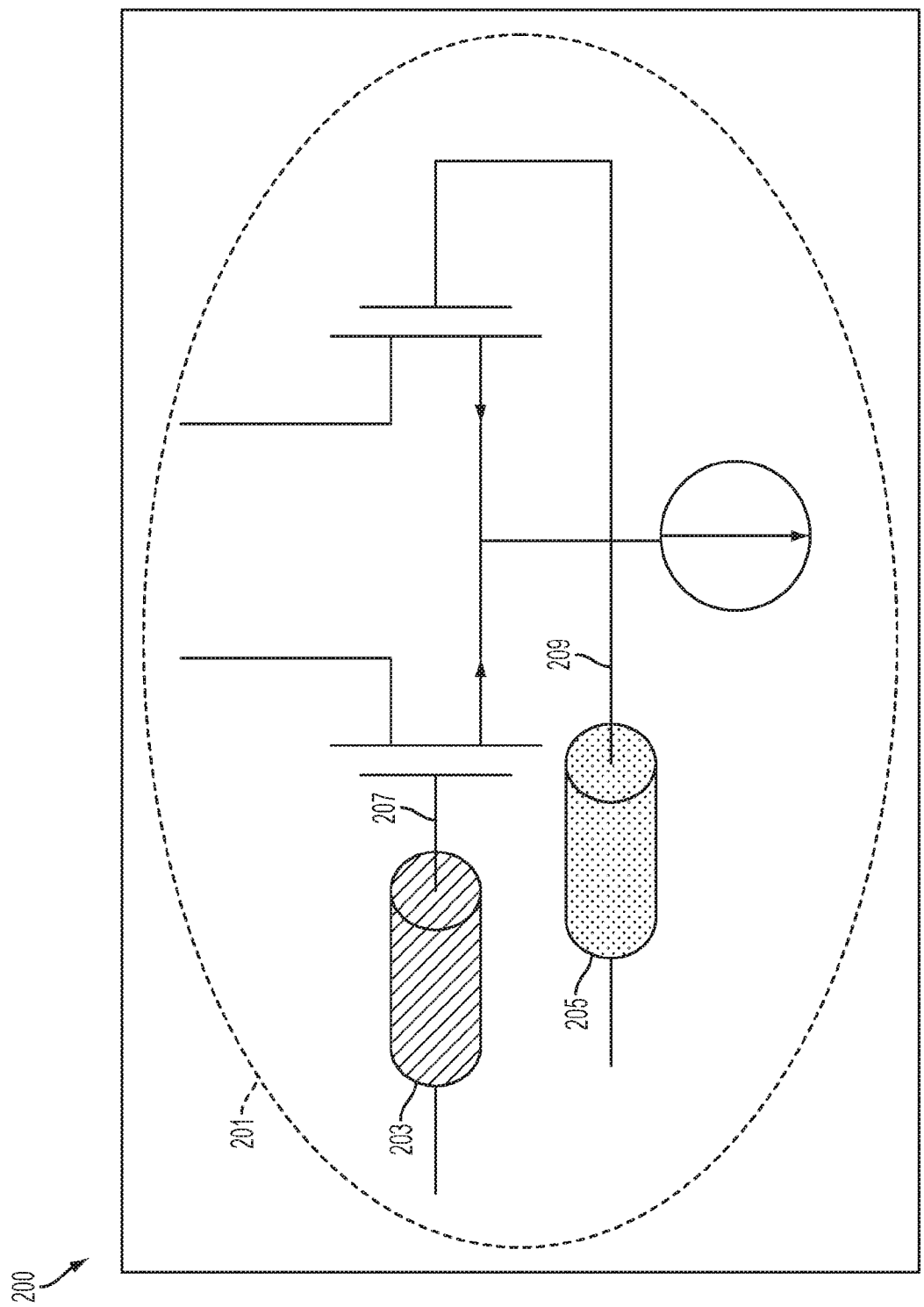
FIG. 2 is a diagram of a color-coded schematic, in accordance with one or more embodiments.

FIG. 2 is a diagram of a color-coded schematic 200 generated by the integrated circuit design system 100, in accordance with one or more embodiments.

The schematic 200 is a schematic drawing of a designed IC 201 having a first circuit component 203 and a second circuit component 205 coupled to other features of the IC 201 by first interconnect 207 and second interconnect 209. The first circuit component 203 and the second circuit component 205 are represented in symbolic form in the schematic 200. The schematic 200 is displayed via user interface 111 (FIG. 1). The first circuit component 203 and the second circuit component 205 are shown in the schematic 200 as having two different color schemes. The different color schemes are exemplified by different fill in FIG. 2, but should be understood as being a color, or combination of colors, shades, patterns, gradients, transparencies, or other suitable variation capable of distinguishing or representing RC values of the first circuit component 203 and the second circuit component 205.

In some embodiments, the first interconnect 207 and the second interconnect 209 either assume the same color scheme or predominant color scheme of the first circuit component 203 or the second circuit component 205 to which the first interconnect 207 or the second interconnect 209 is attached. In some embodiments, if the first interconnect 207 and/or the second interconnect 209 affect the estimated RC value of an attached circuit component or nearby circuit component, which thereby affects the assigned color scheme of the first circuit component 203 or the second circuit component 205, the IC design platform 103 optionally updates the assigned color scheme to reflect the change of the estimated RC value and optionally causes the first interconnect 207 and/or the second interconnect 209 to adopt the same varied color scheme.

Generating a color-coded schematic 200 is applicable for use in designing IC's that employ double patterning technologies, triple patterning technologies, or another suitable patterning technology used for designing and/or manufacturing an IC.

Figure 3:
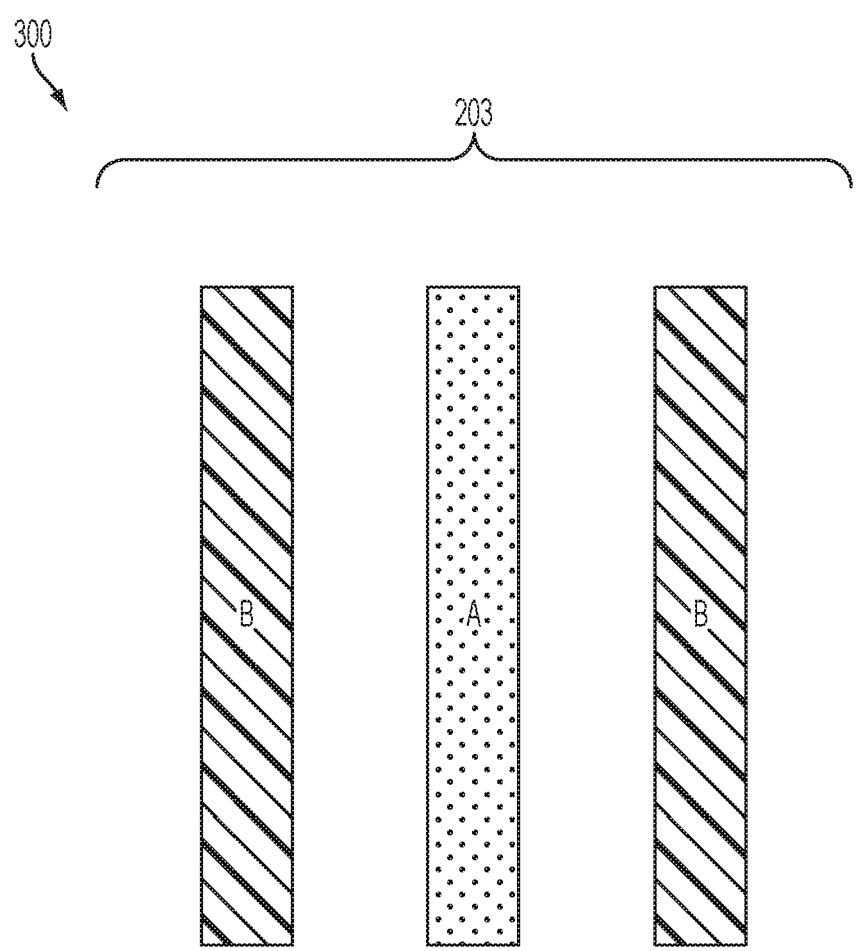
FIG. 3 is a diagram of a color-coded layout of a circuit component, in accordance with one or more embodiments.

FIG. 3 is a diagram of a color-coded layout 300 of the first circuit component 203, in accordance with one or more embodiments.

The layout 300 is a layout view of the first circuit component 203 as displayed by the user interface 111 (FIG. 1). The first circuit component 203 has a circuit component configuration, in this example, formed by a two-mask pattern BAB (e.g., a combination of masks A and B). The symbolic representation of the first circuit component 203 included in the schematic 200 (FIG. 2) has the same color scheme as the color scheme assigned to the pattern BAB of the first circuit component 203. The displayed first circuit component 203 included in the schematic 200 assumed the predominant color scheme between mask B and mask A in this example. Then, when the layout 300 of the first circuit component 300 was generated, the same color scheme assigned to the mask pattern BAB translated from the schematic 200 to the layout 300 for the first circuit component 203.

Figure 4:
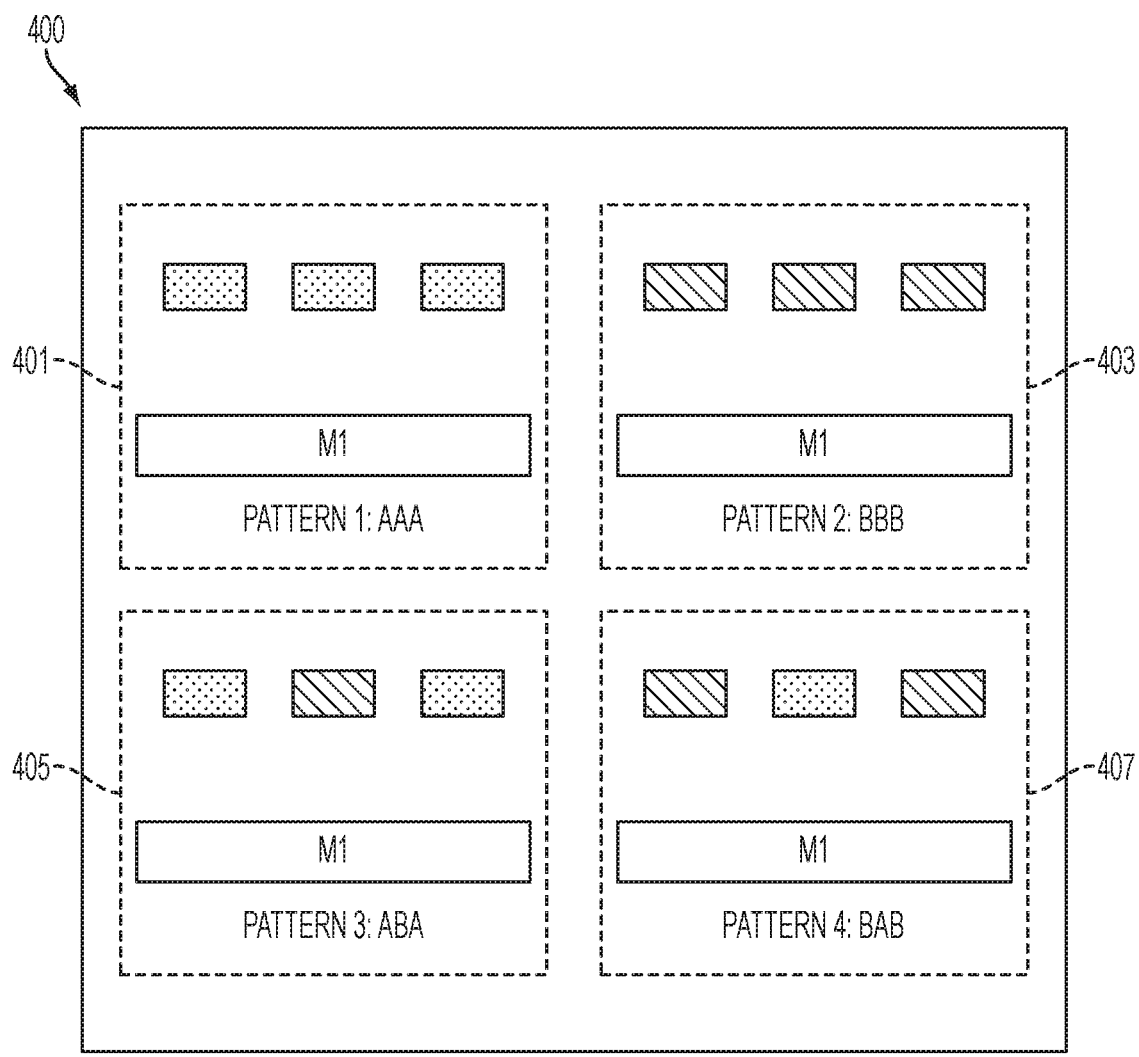
FIG. 4 is a diagram of a user interface with selectable configurations of a circuit component, in accordance with one or more embodiments.

FIG. 4 is a diagram of a user interface 400 having selectable configurations of a circuit component, in accordance with one or more embodiments.

The user interface 400 is accessible by way of user interface 111 (FIG. 1). In this example, user interface 400 shows four selectable patterns or configurations 401, 403, 405 and 407 of a circuit component to be included in the designed IC 201 (FIG. 2), represented in the schematic 200 (FIG. 2), and included in the layout 300. The circuit component configurations 401, 403, 405 and 407 are illustrated as cross-section views of how the circuit component would appear in the layout 300 and are color-coded to represent the estimated RC value for the circuit component configurations 401, 403, 405 and 407. In some embodiments, a textual estimated RC value is also displayed with the circuit component configurations 401, 403, 405 and 407. Though illustrated and discussed as having four circuit component configurations 401, 403, 405 and 407, the user interface 400, in some embodiments, provides a greater or lesser number of patterns or individual circuit components available for inclusion in the IC 201 (FIG. 2) as provided in the database 107 (FIG. 1). The predominant color scheme assigned to whichever of the circuit component configurations 401, 403, 405 or 407 that is selected for a circuit component to be included in the schematic 200, for example, is the color scheme that the symbolic representation of the circuit component has in the schematic 200 to represent the estimated RC value associated with the selected configuration. Then, when the layout 300 is generated, the color scheme assigned to the selected configuration is displayed accordingly.

In some embodiments, the color schemes are more involved than a different combination of colors, but alternatively, or additionally, include variations of colors that represent estimated RC values. For example, in some embodiments, the IC design platform 103 will generate different color patterns for different resistances, coupling capacitances, and total capacitances for various circuit components, combinations, configurations or patterns thereof based, for example, on a simulation of the circuit component configurations 401, 403, 405, and 407.

Figure 5:
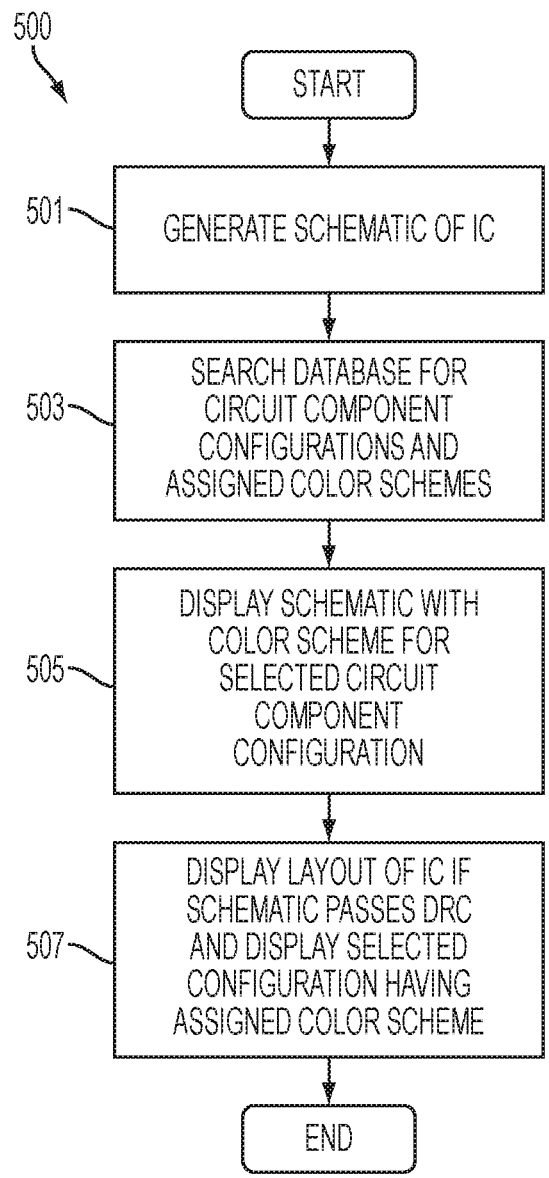
FIG. 5 is a flowchart of a method of generating a color-coded schematic and a color-coded layout, in accordance with one or more embodiments.

FIG. 5 is a diagram of a method 500 of generating a color-coded schematic of a designed IC, generating a layout of the designed IC, and synchronizing the color scheme assigned to the symbols representing the circuit components in the schematic to the circuit components in the layout of the designed IC such that the circuit components in the schematic and the layout have the same color scheme, in accordance with one or more embodiments.

Figure 20:
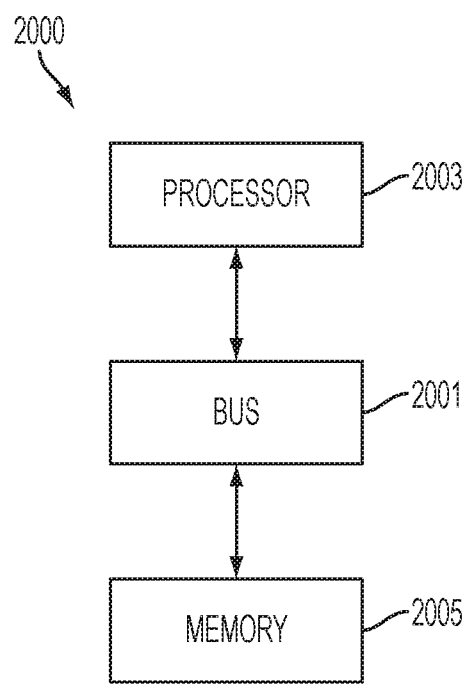
FIG. 20 is a diagram of a chip set by which an embodiment is implemented.

Method 500 begins with step 501 in which a processor such as processor 2003 or a control module implemented by processor-based system 2000 discussed in FIG. 20, executes an instruction to generate a schematic of an IC. The generated schematic is based on an IC designed having one or more circuit components. IC circuit components comprise, for example, resistors, transistors, wires, capacitors, switches, nodes, interconnects, vias, gates, sources, drains, doped regions, channels, or other suitable IC circuit components. A pre-simulation of the generated schematic is also performed.

In step 503, a database having one or more configurations of the circuit component is searched. The one or more configurations of the circuit component have a corresponding estimated resistance capacitance (RC) value and an assigned color scheme based on the estimated RC value.

In step 505, the circuit component is displayed in the schematic as a symbol representing the circuit component. The symbol representing the circuit component is displayed having the assigned color scheme of a selected configuration of the circuit component.

In step 507, a layout of the IC is displayed based on a determination that the schematic passed a design rule check. The displayed layout of the IC includes the selected configuration of the circuit component, the selected configuration being displayed in the layout having the assigned color scheme.

Figure 6:
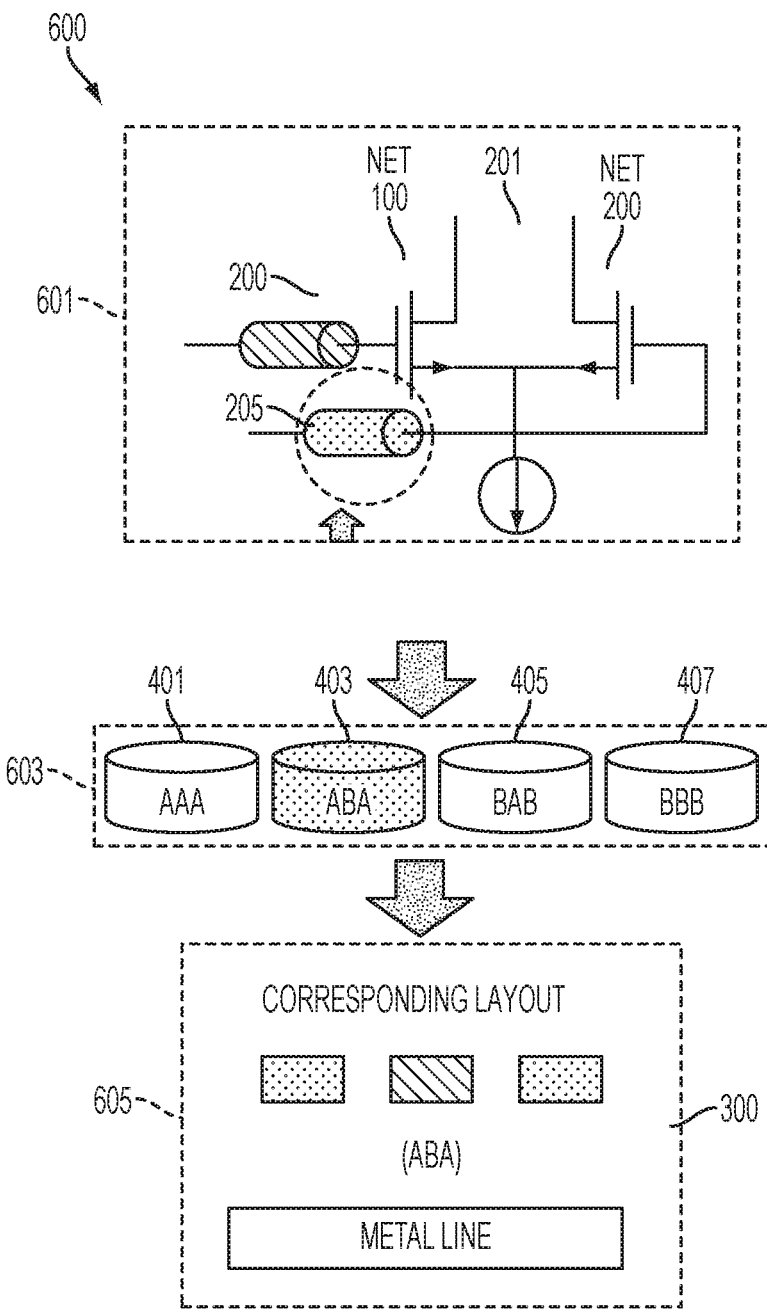
FIG. 6 is a flowchart of a method of synchronizing a color-coded schematic with a color-coded layout of a circuit component, in accordance with one or more embodiments.

FIG. 6 is a flowchart of a method 600 of synchronizing a color-coded schematic with a color-coded layout of a circuit component, in accordance with one or more embodiments.

Method 600 begins with step 601 in which circuit component 205 is selected in the schematic 200. In step 603, a plurality of representations of available configurations 401, 403, 405, and 407 for the selected circuit component 205 is made available, and one of the configurations that make up the selected circuit component 205 (i.e., configuration 403) is selected. The plurality of available circuit component configurations 401, 403, 405, and 407 are displayed in step 603 from a high level with the assigned color scheme, which is based on the estimated RC values determined from a Raphael simulation or other RC estimation/determination process for the circuit component configurations 401, 403, 405, and 407. The estimated RC values, assigned color schemes, and geometric information of the available patterns are stored in the database 107, for example, in the form of Raphael tables. The plurality of available circuit component configurations 401, 403, 405, and 407, for example, are stored in the database 107 as selectable elements of a process design kit (PDK) that includes the assigned color scheme, geometric parameters, estimated RC values and pattern data as pulled from the Raphael tables by the callback function configured to search for stored estimated RC values, color schemes, geometric parameters and pattern data and return the requested information. The estimated RC values are displayed either by inference based on the assigned color scheme, or in textual form along with the plurality of available circuit component configurations 401, 403, 405, and 407. In some embodiments, a drill-down menu is available that provides the layout view of the available patterns such as one that opens user interface 400 (FIG. 4).

In step 605, the layout 300 is generated and displayed in the cross-section view of the selected circuit component 205 having the color scheme assigned to the selected configuration 403. In some embodiments, a top-side, bottom-side, side-view, or isometric view is generated and displayed in step 605.

Figure 7:
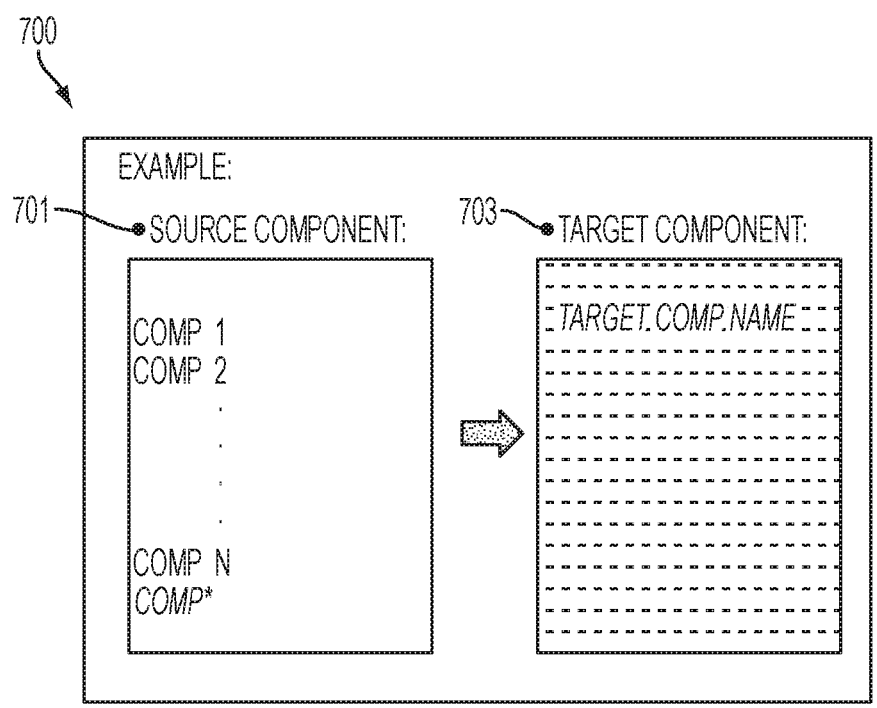
FIG. 7 is a diagram of a user interface with a list of source components and target components, in accordance with one or more embodiments.

FIG. 7 is a diagram of a user interface 700 demonstrating a list of source components and target components for an alignment process, in accordance with one or more embodiments.

The user interface 700 is accessible by way of the user interface 111 (FIG. 1) and displays a source component list 701 and a target component list 703. Based on a user interaction with the user interface 111 indicating that a selected component is to be aligned with a target component, the IC design platform 103 (FIG. 1) causes the user interface 700 to be displayed. The source component list 701 is populated by selecting one or more circuit components included in the schematic 200 (FIG. 2) by way of user interface 111. The IC design platform 103 either causes a default list of target components to be provided in a target component list 703, causes a component selected or identified by a user interaction designating a selected circuit component to be the target component to be included in the target component list 703, or compares the selected circuit component(s) to available target components stored in the database 107 and estimates which available target components should be included in the target component list 703, thereby including estimated target components in the target component list 703. The IC design platform 103, for example, compares an estimated RC value, circuit component geometry, circuit component configuration, circuit component placement, or other descriptive factor with the available target components stored in database 107 and populates the target component list with one or more target components that identically match the selected circuit components in the circuit component list 701, match the selected circuit components in the source component list 701 within a predetermined threshold. For example, the target component list 703, in some embodiments, is populated with target components that are a 50% or better match with the selected source components in the source component list 701.

Similarly, in some embodiments, the target component list 701 is capable of being further refined by selecting two or more of the source components in the source component list 701 to either analyze multiple selected circuit components at once, or to combine the selected source components to form a circuit component configuration which the IC design platform 103 compares to available target components or target configurations to populate the target component list 703.

In some embodiments, a random combination of source components is optionally selected, and the IC design platform 103 causes the target component list 703 to be populated based on target components that identically match available target components, or match target configurations within a predetermined threshold, e.g., a better than 50% match.

By way of user interface 700, a target component in the target component list 703 is selected and the source component in the schematic 200 is either one replaced with the target component, or reconfigured to have the same target component configuration as the target component, thereby causing the source component to at least have the same estimated RC value as the target component selected from the target component list 703. As such, the source component selected in the schematic 200 is brought into alignment with the selected target component.

Figure 8:
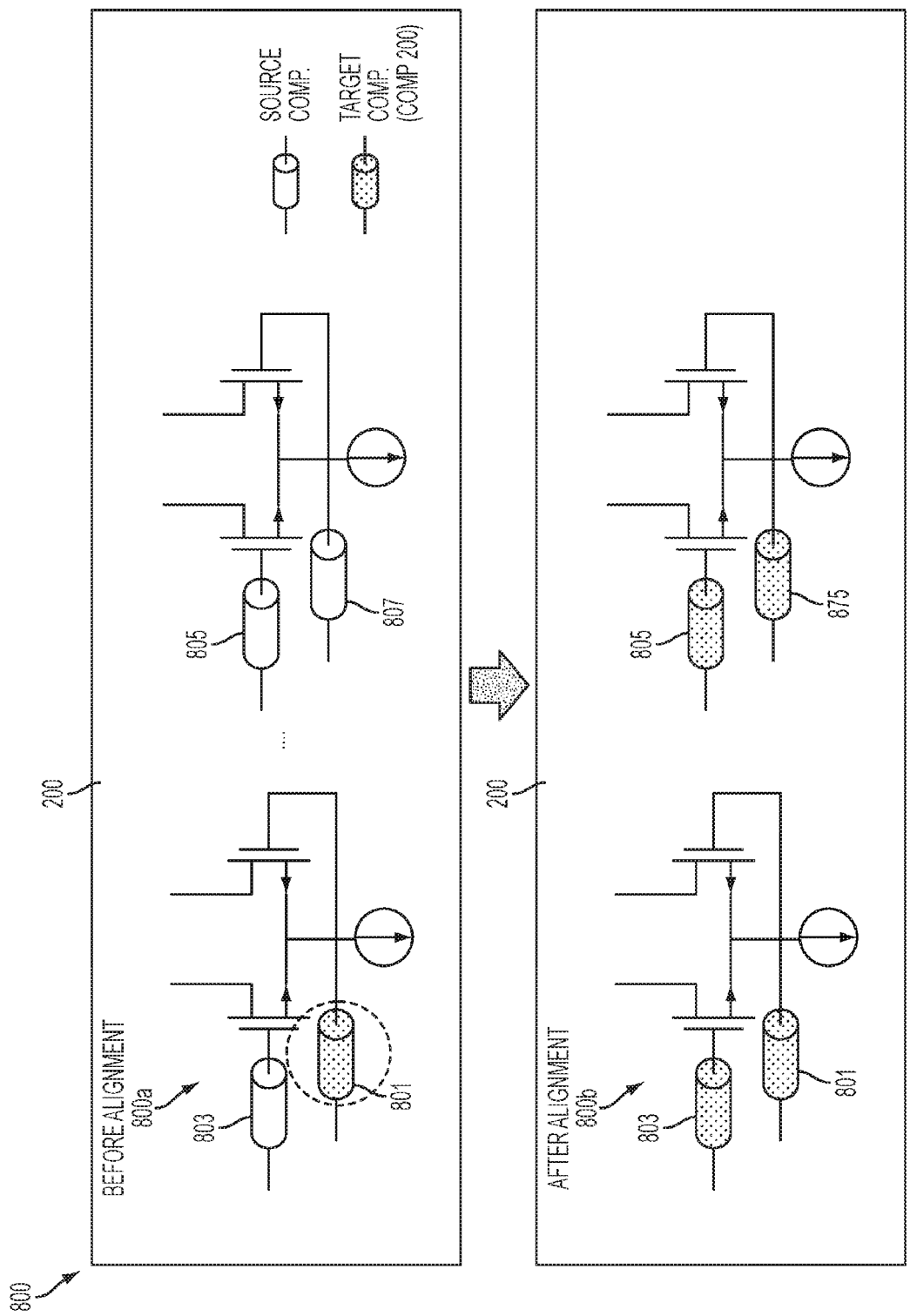
FIG. 8 is a diagram of a user interface by which a circuit component is aligned with a target component, in accordance with one or more embodiments.

FIG. 8 is a diagram of a user interface 800 by which a selected circuit component is brought into alignment with a target component, in accordance with one or more embodiments.

The user interface 800 is accessible by way of the user interface 111 (FIG. 1). Based on a user interaction with the user interface 111 indicating that a selected component is to be aligned with a target component, the IC design platform 103 (FIG. 1) causes the user interface 800 to be displayed. User interface 800a includes schematic 200 having a plurality of circuit components, circuit component 801, circuit component 803, circuit component 805, and circuit component 807. The circuit components included in the schematic 200 in user interface 800a are not aligned to have a same or similar RC value. As such, the components in the schematic 200 illustrated in user interface 800a do not share the same color scheme. But, if an alignment process is performed, one of the circuit components is optionally designated as a target component. In this example, circuit component 801 is selected in user interface 800a to be the target component and circuit component 803, circuit component 805, and circuit component 807 are selected to be source components.

After execution of the alignment process, all of the selected source components circuit component 803, circuit component 805, and circuit component 807, in this example, are brought into alignment with the selected target component, comp 200, so that the selected source components assume the same or similar RC values as the target component. Further, as shown in user interface 800b, the source components circuit component 803, circuit component 805, and circuit component 807 are modified between user interface 800a and user interface 800b to share the same color scheme as the selected target component in the updated schematic 200 following execution of the alignment process. Similarly, any interconnects affiliated with the circuit components are optionally updated to have the same color scheme as the aligned source components.

As discussed, IC's are capable of having any number of circuit components. The IC design platform 103 makes it possible to align any number and any combination of circuit components that are included in the designed IC, with one another, combinations thereof, or circuit components stored in database 107 (FIG. 1).

Figure 9:
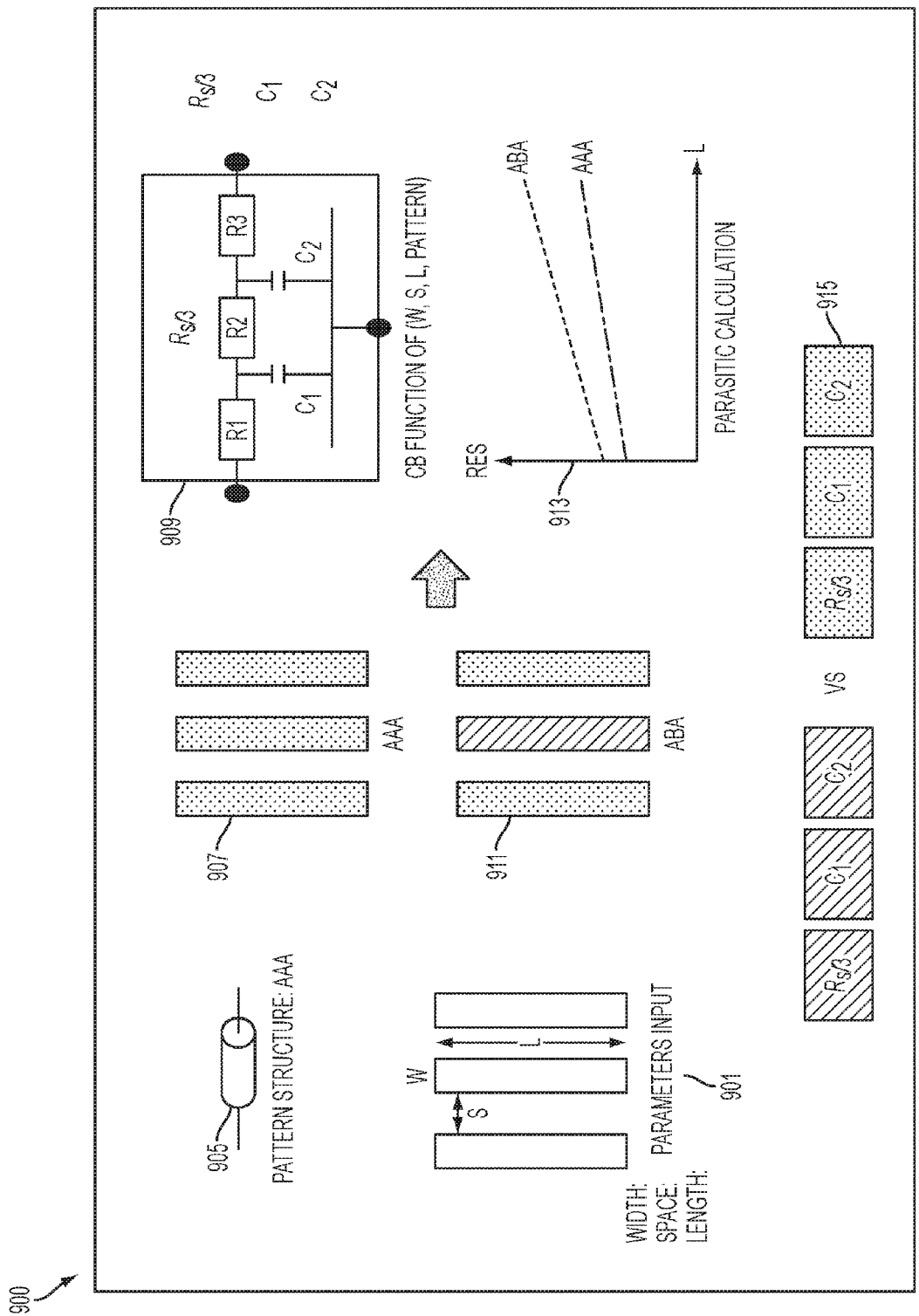
FIG. 9 is a diagram of a user interface that displays a performance characteristic comparison, in accordance with one or more embodiments.

FIG. 9 is a diagram of a user interface 900 that displays a performance characteristic comparison of a selected source component and a designated target component configuration, in accordance with one or more embodiments.

The user interface 900 is accessible by way of the user interface 111 (FIG. 1) and displays circuit component parameter geometry inputs 901 (i.e., width, space, length) of a selected source component 905. Based on a user interaction with the user interface 111 indicating that a selected component is to be compared with a target component, the IC design platform 103 (FIG. 1) causes the user interface 900 to be displayed. The geometry inputs are either based on user inputs or based on a search of database 107 for circuit component parameters of the selected source component 905.

The selected source component 905, in this example, has a pattern structure AAA and is capable of having a pattern structure ABA. The pattern structure AAA is assigned a color scheme 907 based on the geometry inputs 901 and the pattern structure AAA. The user interface 900 further displays a target pattern structure ABA having a different color scheme 911. The IC design platform 103 (FIG. 1) estimates the RC values of the source component 905 having the source component configuration and the target component configuration, and displays a comparative analysis of the results of the calculation in one or more of a numerical form along with an informational schematic view 909 of the selected circuit component or graphical form such as by way of performance comparison chart 913 displayed via the user interface 900. The informational schematic view 909 corresponds to the schematic 200 (FIG. 2) from which the source component 905 was selected and the performance comparison chart displays comparison data based on performance simulations conducted by the IC design platform 103. The parasitic resistance values plotted in the performance comparison chart 913 are a function of the geometric parameters (i.e., width, spacing and length) and the pattern structure. The comparative results included in the comparative analysis chart are rendered in accordance with the assigned color scheme for the pattern structures AAA and ABA.

One or more of the geometry inputs or the estimated RC values are processed by the wire-load estimation module 115 (FIG. 1) of the IC design platform 103 to provide a mismatch quantity (%) calculation between selected source component pattern structure AAA and the designated target component pattern structure ABA. In some embodiments user interface 900 additionally or alternatively displays values for a delta wire-load resistor, coupling cap and total cap calculation or other sensitive items of interest regarding the potential performance of the source component as compared to the target pattern structure, and to show the degree of determined mismatch between the selected source components and the designated target component in tabular form such as by table 915. Table 915, in some embodiments, optionally takes on the color schemes 907 and 911 of the source and target pattern structures AAA and ABA that the comparative portions of the table 915 describe.

Though illustrated as having different configurations (e.g., AAA vs. BBB), in some embodiments, the estimated RC value of the source component and the target component varies based on other factors such as component placement in the IC. As such, the color-aware parasitic impact demonstration in user interface 900 makes it possible to easily discern the estimated RC value or impact that an alignment of a source component with a target component has even in the same wire-load geometry.

Figure 10:
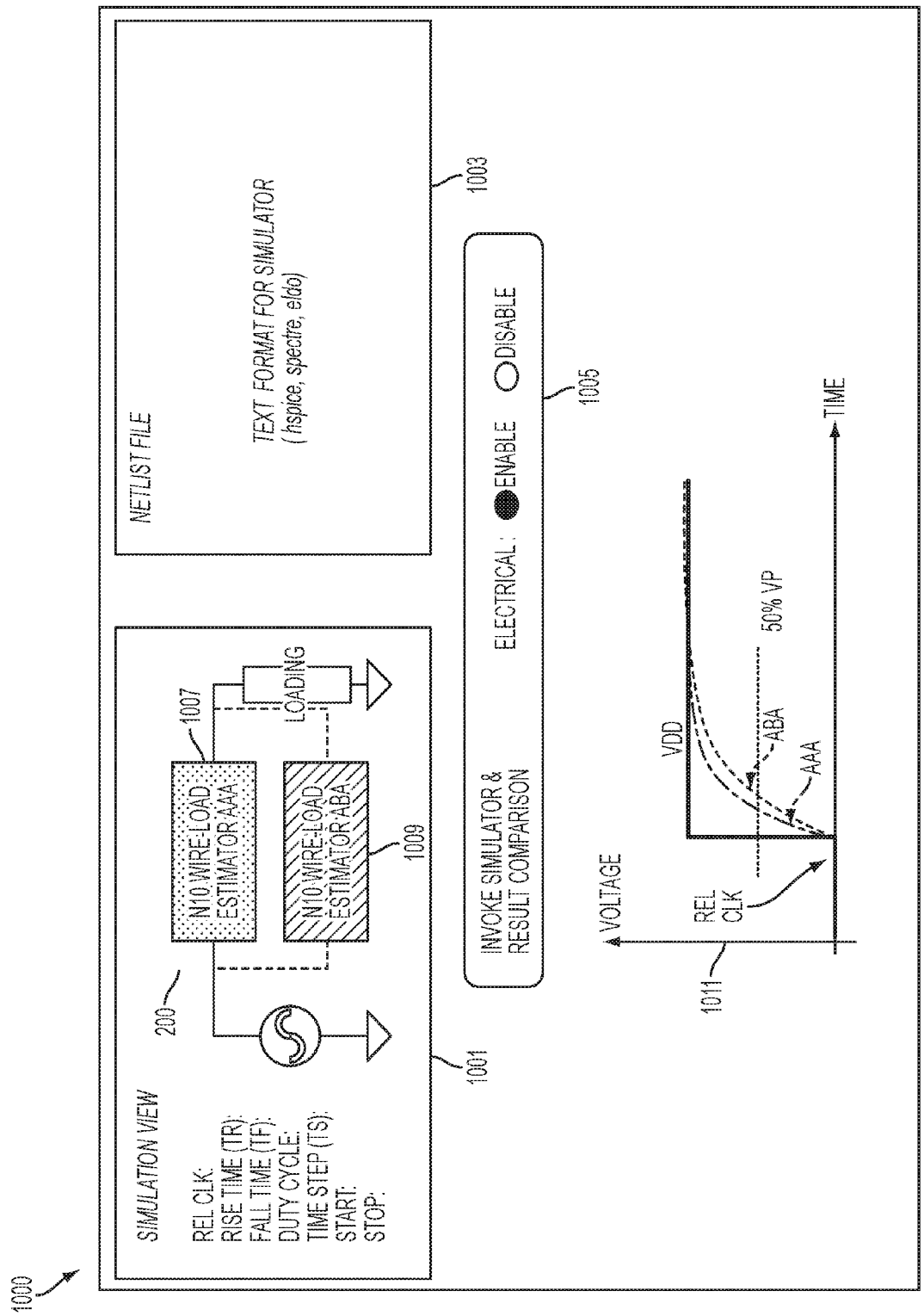
FIG. 10 is a diagram of a user interface that displays a simulation view of a color-coded schematic, in accordance with one or more embodiments.

FIG. 10 is a diagram of a user interface 1000 of a simulation view of schematic 200 that compares how a source component performs versus a target component, in accordance with one or more embodiments.

User interface 1000 is accessible by way of the user interface 111 (FIG. 1) and provides a simulation view 1001 and a netlist file 1003 that the IC design platform 103 causes to be displayed in response to a simulation and result comparison option button 1005 being enabled. In this example, simulation view 1001 includes at least a portion of schematic 200 and has a source component 1007. In response to a user selection indicating that circuit component 1007 is the selected source component 1007, the IC design platform 103 simulates and compares the performance of the selected source component 1007 to the performance of a user designated target component 1009 to determine rise time, fall time, timing delay and delta timing delay. The IC design platform 103 causes the simulation results to be displayed in simulation result graph 1011, which optionally illustrates the performance trend of the source component 1007 versus the target component 1009 in the same color scheme as source component 1007 and target component 1009. The target component 1009 is pulled from the netlist file 1003, which is stored in the database 107 (FIG. 1), for example, by the IC design platform 103 (FIG. 1) by the callback function in response to a request to align, replace, or compare, one or more selected source components with a target component.

Figure 11:
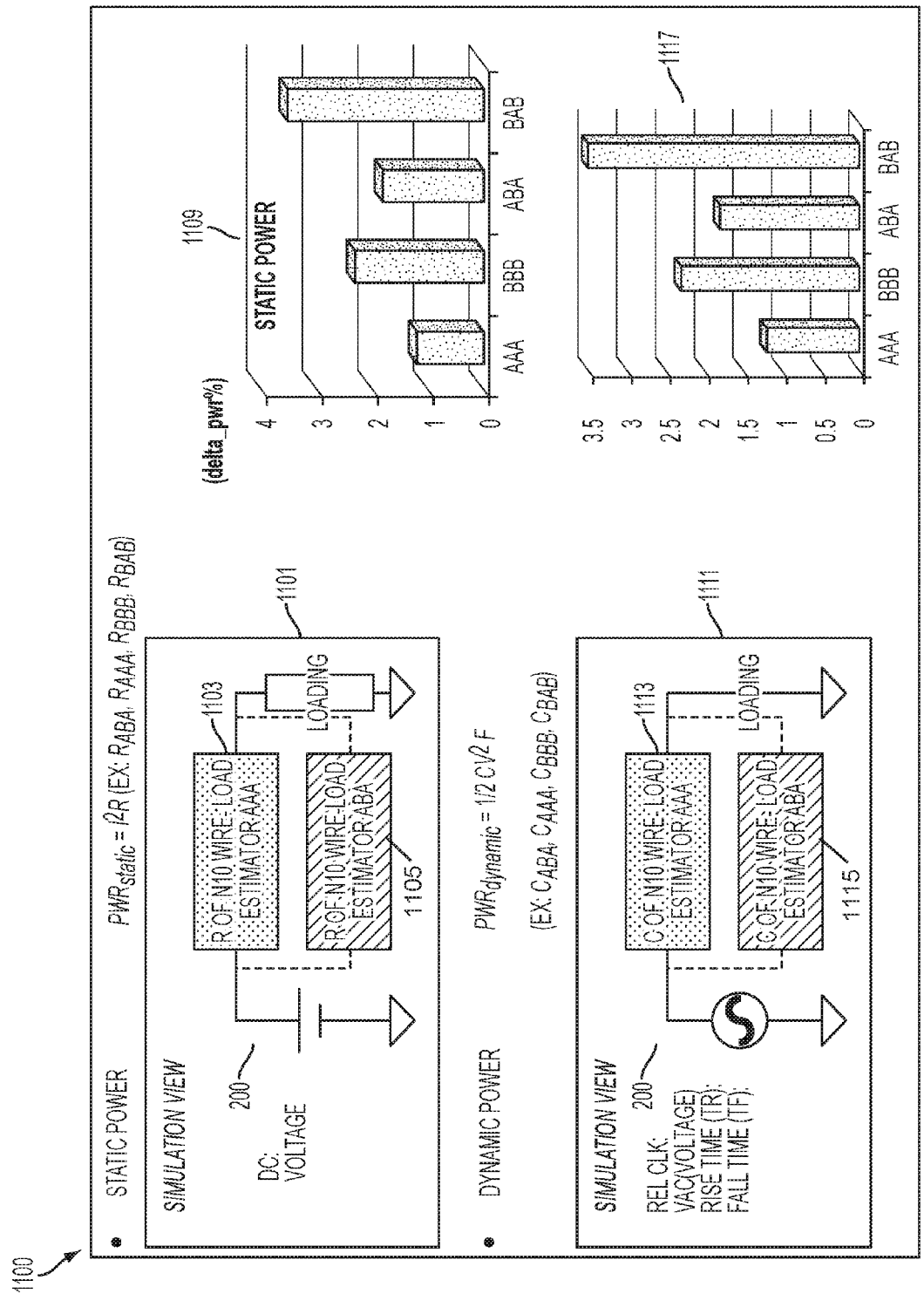
FIG. 11 is a diagram of a user interface that displays a simulation view of a color-coded schematic, in accordance with one or more embodiments.

FIG. 11 is a diagram of a user interface 1100 of a simulation view of schematic 200 that compares how a source component performs versus a target component, in accordance with one or more embodiments.

The user interface 1100 is accessible by way of the user interface 111 (FIG. 1). In this example, simulation view 1101 that the IC design platform 103 causes to be displayed in response to a circuit component power simulation, includes at least a portion of schematic 200 and has a source component 1103. In response to a user selection indicating that circuit component 1103 is the selected source component 1103, the IC design platform 103 conducts a performance of the selected source component 1103 and compares the performance of the selected source component 1103 against a designated target component 1105 designated by the user via user interface 1100. The IC design platform 103 determines static power and delta power % as a function of R for each available pattern of the source component 1103 and compares the results to the target component 1105 in a static power comparison chart 1109. The IC design platform 103 causes the comparison chart 1109 to be displayed by the user interface 1100. Similarly, another simulation view 1111 includes at least a portion of schematic 200 and source component 1113 compared to target component 1115 to determine rise time, fall time, and dynamic power as a function of C. The IC design platform 103 also causes the results of the dynamic power analysis are displayed in dynamic power chart 1117 via user interface 1100.

Figure 12:
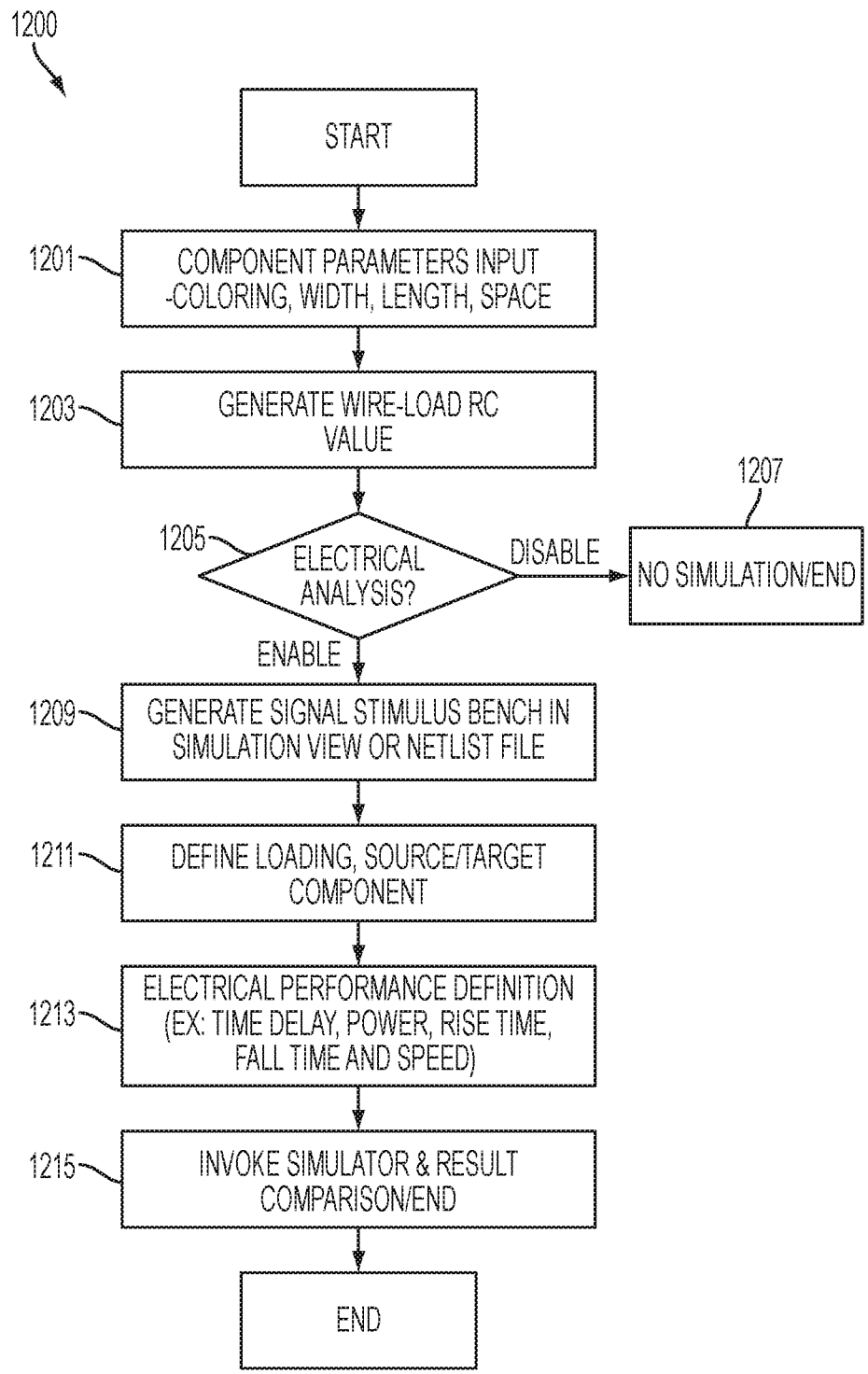
FIG. 12 is a flowchart of a method conducting an electrical analysis of one or more circuit components, in accordance with one or more embodiments.

FIG. 12 is a flowchart of a method 1200 for conducting the electrical analysis of the one or more circuit components, in accordance with one or more embodiments.

Method 1200 begins with step 1201 in which component parameters (e.g., color scheme, width, length, spacing) of a circuit component are input into user interface 111 (FIG. 1) by a user and received by the IC design platform 103 (FIG. 1). In step 1203, the IC design platform 103 processes the component parameters and generates a wire-load RC value for the circuit component based, for example, on either the input component parameters or component parameters extracted from a circuit component included in the schematic 200 (FIG. 2) or to be included in the schematic 200. In some embodiments, a user input by way received by way of user interface 111 optionally includes selecting a circuit component from the schematic 200. In step 1205, the IC design platform 103 determines whether a simulation for conducting an electrical analysis of the circuit component is to be performed based on whether a user interface selection/ toggle button to enable or disable the simulation has been selected. If the simulation button disabling the simulation is selected, the process continues to step 1207 at which process 1200 ends and no simulation is performed. But, if the simulation button enabling the simulation is selected, process 1200 continues to step 1209 in which a signal stimulus benchmark is generated in a simulation view or a netlist file. In step 1211, a loading and source/target components are defined. In step 1213, a selection is made regarding what electrical performance properties are to be determined. For example, time delay, power, rise time, fall time, speed, R, C, or another circuit performance property. In step 1215, the simulation is performed and the results are displayed on a user interface for comparison.

Figure 13:
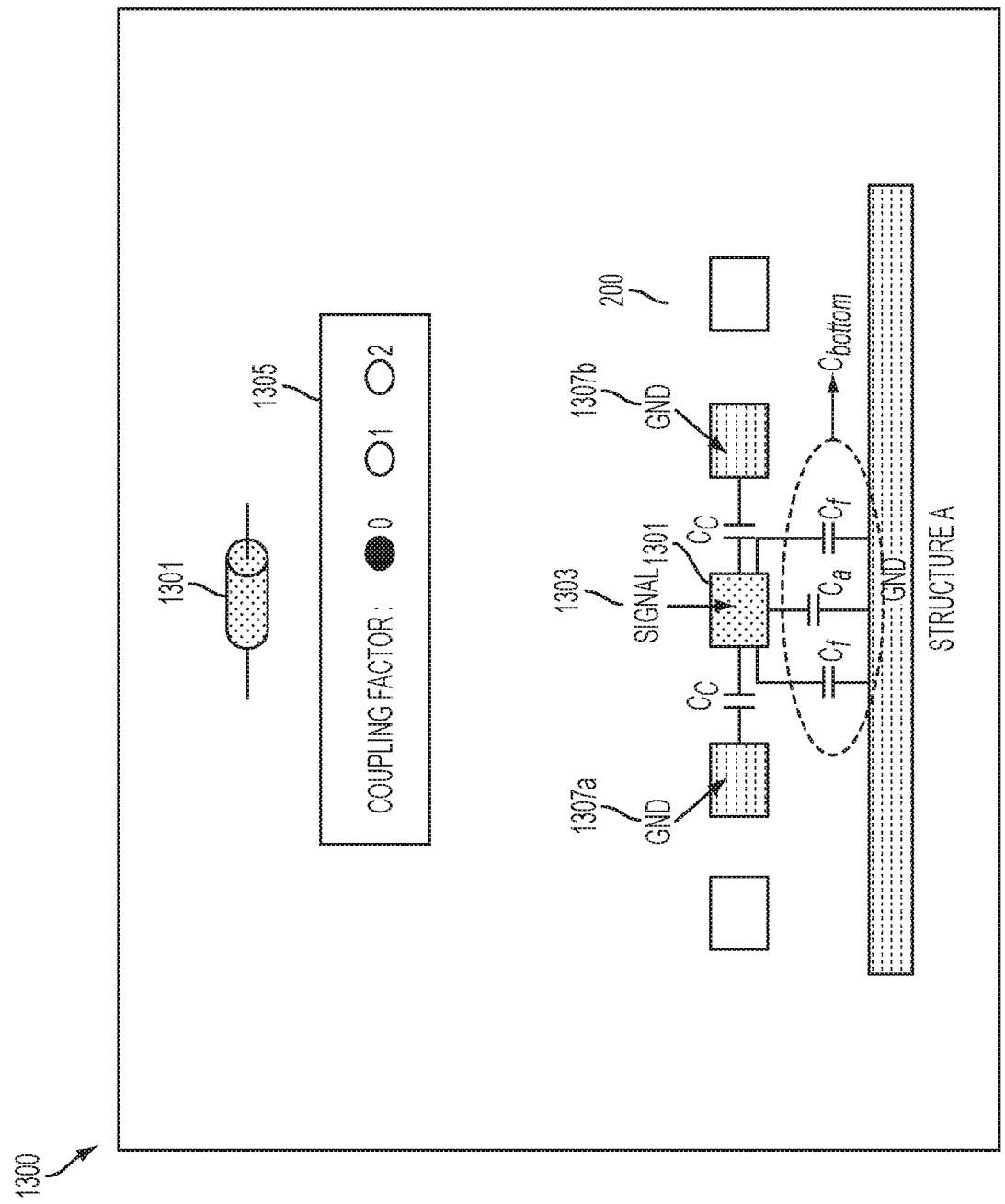
FIG. 13 is a diagram of a user interface that displays assigning a coupling factor to a circuit component, in accordance with one or more embodiments.

FIG. 13 is a diagram of a user interface 1300 for initiating a coupling analysis and assignment of a coupling factor for selected circuit components, in accordance with one or more embodiments.

User interface 1300 is accessible by way of the user interface 111 (FIG. 1) and includes an illustration of a selected circuit component 1301 through which a signal 1303 is transmitted and a coupling factor assignment box 1305 by which a coupling factor of 0, 1 or 2 is assigned via a user input. IC design platform 103 causes user interface 1300 to be displayed based on a determination that the coupling effect should be or is requested by the user to be considered in RC value estimation and schematic generation. The coupling factor is assigned based on the schematic 200 (FIG. 2), for example, and on one or more other circuit components that are nearby the selected circuit component 1301. A coupling factor of "1" refers to a steady direct current (DC) or static signal, a coupling factor of "0" refers to a same phase stimulus, and a coupling factor of "2" refers to a 180 degree phase shift stimulus of the transmitted signal. Default RC behavior of the selected circuit component 1301 is available by way of a lookup table stored in the database 107 for recall based on the selected circuit component 1301 and available circuit component attributes stored in the database 107, for example, to assign the coupling factor. In this example, the surrounding circuit components 1307a and 1307b are ground lines which are accordingly assigned coupling factors of "1" because the ground lines do not affect the estimated RC value for the selected circuit component 1301.

Figure 14:
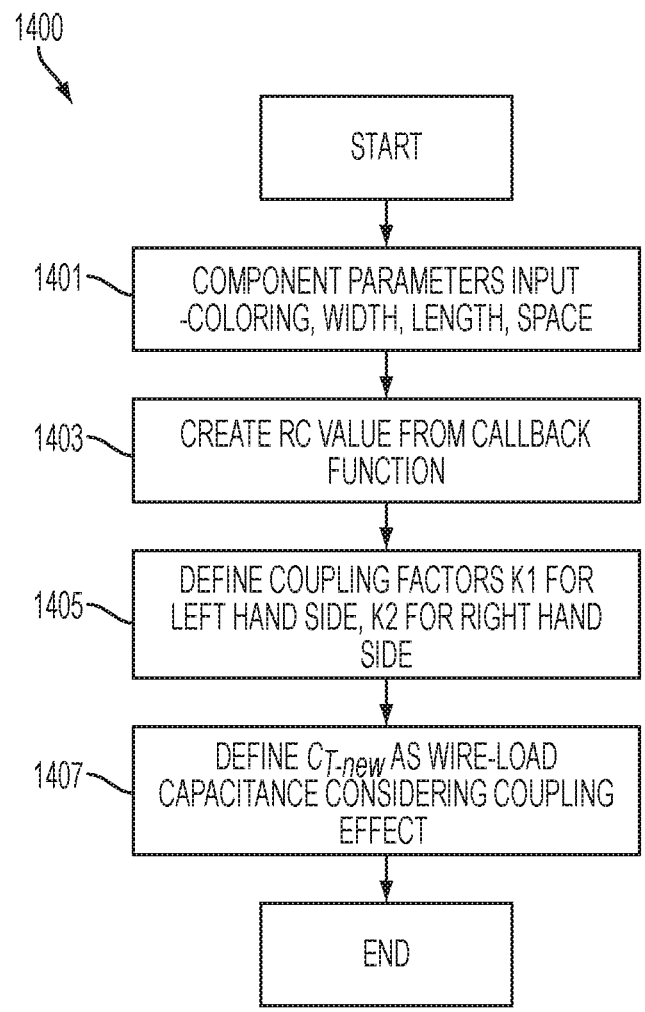
FIG. 14 is a flowchart of a method of determining a capacitance value of a circuit component based on an assigned coupling factor, in accordance with one or more embodiments.

FIG. 14 is a flowchart of a method 1400 of determining a capacitance value of a selected circuit component taking a designated coupling effect into consideration, in accordance with one or more embodiments.

Method 1400 starts with step 1401 in which the component parameters of a selected circuit component are input by a user or input via a component parameter extraction performed by the IC design platform 103 (FIG. 1) to define requisite circuit component parameters associated with selected circuit component through which a signal is transmitted. In step 1403, IC design platform 103 generates an estimated RC value based on the discussed callback function. In step 1405, the defined coupling factor is assigned via user interface 111 (FIG. 1) for the selected circuit component, based on a determination that a signal transmitted through a nearby circuit component is one of in-phase, out-of-phase, or in a steady state with the signal transmitted through the selected circuit component. In step 1407, the IC design platform 103 generates an updated C value, e.g., $C_{T\text{-}new}$, for the selected circuit component using the assigned coupling factor. The updated C value is displayed via the user interface 111 and the color scheme of the selected circuit component is updated to reflect the updated C value that takes the coupling effect into consideration.

Figure 15:
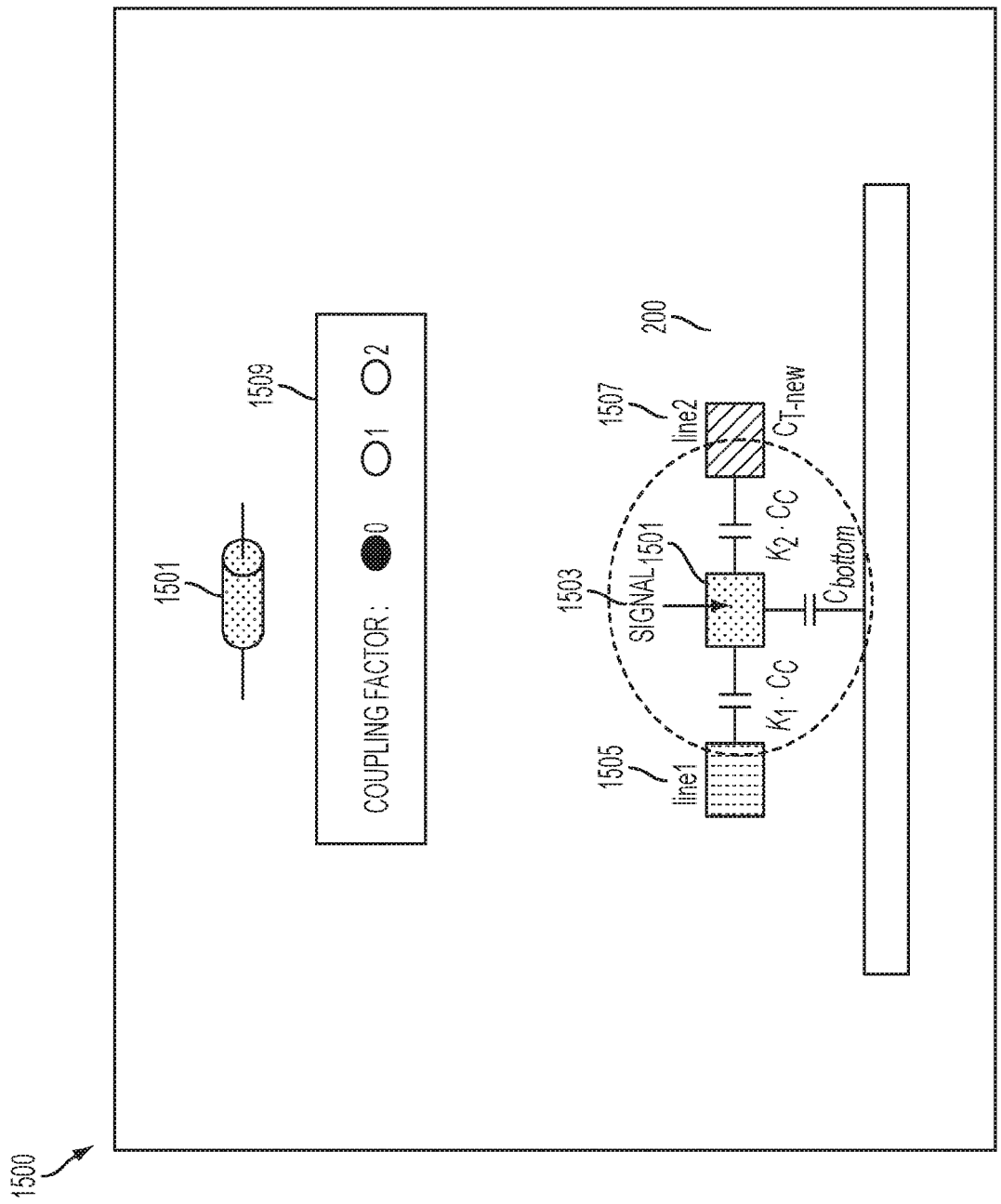
FIG. 15 is a diagram of a user interface that displays assigning a coupling factor to a circuit component, in accordance with one or more embodiments.

FIG. 15 is a diagram of a user interface 1500 for initiating a coupling analysis and assignment of a coupling factor for selected circuit components, in accordance with one or more embodiments.

User interface 1500 is accessible by way of the user interface 111 (FIG. 1) and includes an illustration of schematic 200 having a selected circuit component 1501 through which a signal 1503 is transmitted. IC design platform 103 causes user interface 1300 to be displayed based on a determination that the coupling effect should be or is requested by the user to be considered in RC value estimation and schematic generation. The schematic 200 also includes a first line 1505 and a second line 1507 near the selected circuit component 1501. The lines 1505 and 1507 have their own respective signals transmitted through them that are in-phase, out-of-phase, or in a steady state with the signal 1503. Accordingly, user interface 1500 includes a coupling factor assignment box 1509 by which a coupling factor of "0", "1" or "2" is assigned. In this example, the C value is determined based on both of the selected nearby circuit components 1505 and 1507 using the coupling factors assigned for both of the two selected nearby circuit components 1505 and 1507. A coupling factor of "1" refers to a steady direct current (DC), a coupling factor of "0" refers to a same phase stimulus, and a coupling factor of "2" refers to a 180 degree phase shift stimulus of the transmitted signal 1503 caused by the signal being transmitted through nearby circuit components 1505 and 1507. Default RC behavior of the selected circuit components 1505 and 1507 is available by way of a lookup table stored in the database 107 for recall based on the selected circuit component 1301 and available circuit component attributes stored in the database 107, for example, to assign the coupling factor.

The updated C value is determined based on the following:

$$C_{bottom} = C_a + 2 \cdot C_f \qquad (3)$$

$$C_{T\text{-}new} = C_{bottom} + K_1 \cdot C_C + K_2 \cdot C_C \qquad (4)$$

Figure 16:
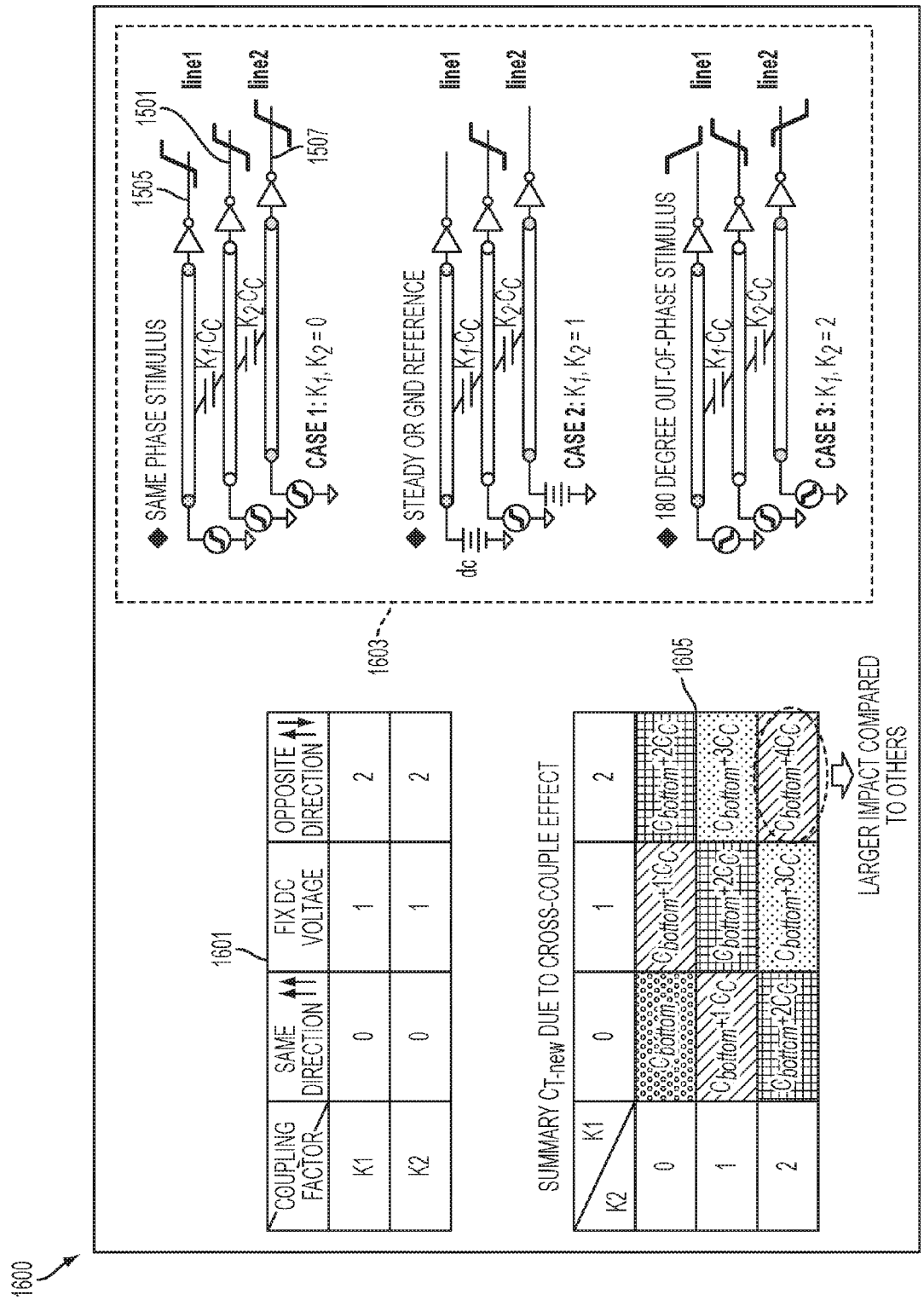
FIG. 16 is a diagram of a user interface that displays coupling analysis results, in accordance with one or more embodiments.

FIG. 16 is a diagram of a user interface 1600 displaying coupling analysis results, in accordance with one or more embodiments.

User interface 1600 is accessible by way of the user interface 111 (FIG. 1) and displays the effects that nearby circuit components 1505 and 1507 have on the capacitance of the selected circuit component 1501 based on user assigned coupling factors K1, K2 for the selected nearby circuit components 1505 and 1507, respectively, in lookup table 1601 which is displayed based on data stored in database 107. A coupling factor assigned to a first line near the selected circuit component is designated as K1, and a coupling factor assigned to a second line near the selected circuit component is designated as K2. A coupling factor (K1, K2) equal to "0" means adjacent lines have a same-phase or in-phase signal, a coupling factor (K1, K2) equal to "1" means adjacent lines have a static signal, and a coupling factor (K1, K2) equal to "2" means adjacent lines have a 180 degree out-of-phase signal.

Additionally, the phase of the signal transmitted through the nearby circuit components 1505 and 1507 is displayed based on the selected coupling factor and compared to a signal transmitted through the selected circuit component 1501 that is between the nearby circuit components 1505 and 1507 as displayed in window 1603. The displayed nearby circuit components 1505 and 1507 retain the assigned color scheme from the schematic 200 in the window 1603.

The user interface 1600 also includes a coupling effect comparison chart 1605 that is color-coded to display the severity the coupling effect has on the C value based on the assigned coupling factor. For example, in some embodiments, if K1=0 and K2=0, then the C value is $C_{bottom}$, and the combination is indicated in a blue color, whereas if K1=2 and K2=2, then the C value is Cbottom+4Cc illustrating a more severe effect on the C value caused by the coupling effect, which is indicated in a red color. The other combinations of coupling factors are also color-coded to illustrate the effect the coupling factor has on the C value by differing colors or shading to quickly illustrate the severity the potential coupling effect has on the signal transmitted through the selected circuit component.

Figure 17:
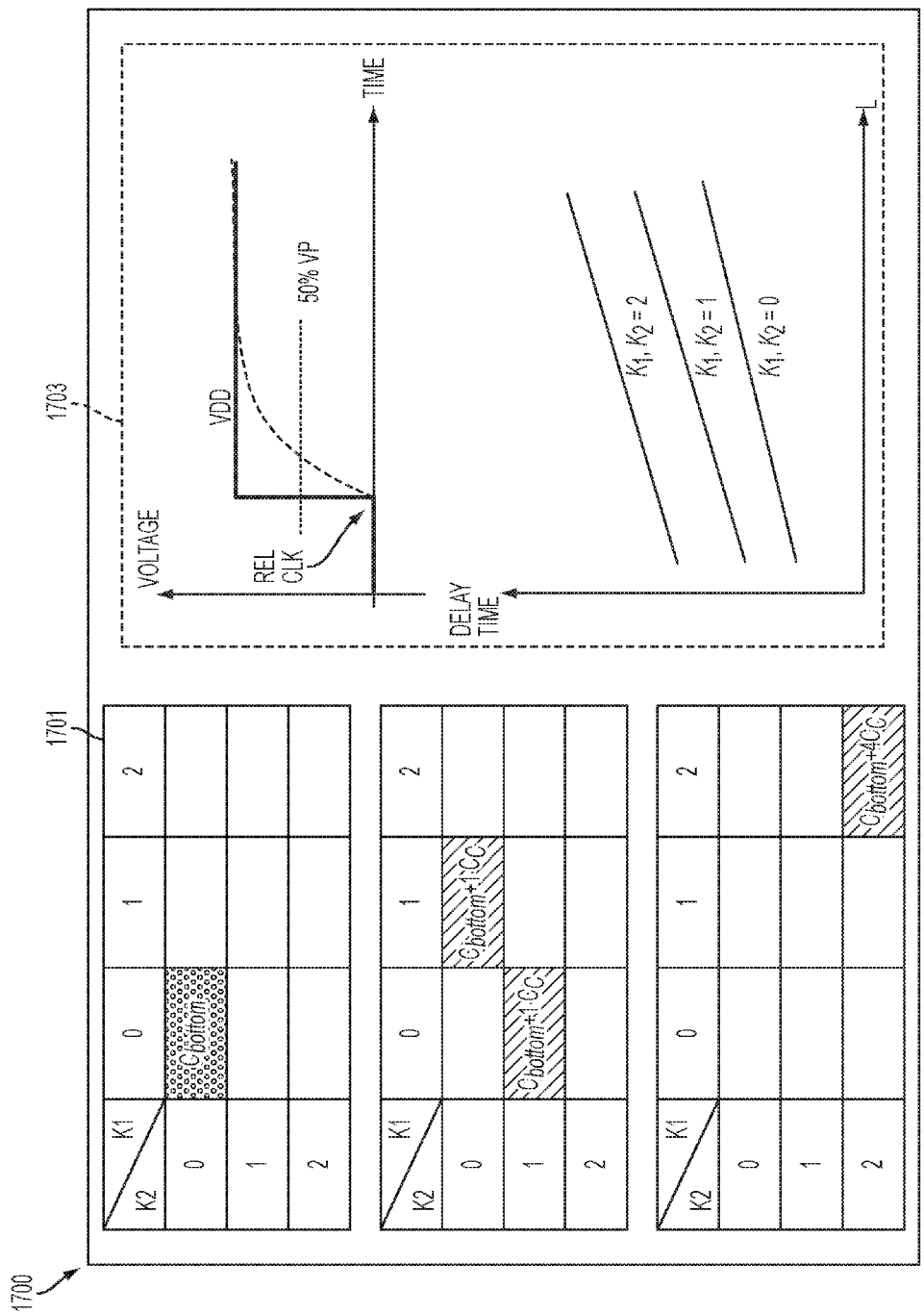
FIG. 17 is a diagram of a user interface that displays coupling analysis results, in accordance with one or more embodiments.

FIG. 17 is a diagram of a user interface 1700 displaying coupling analysis results, in accordance with one or more embodiments.

User interface 1700 is accessible by way of the user interface 111 (FIG. 1) and is caused to be displayed by the IC design platform 103 in response to a user request to further analyze the affects the coupling effect has on circuit component performance. User interface 1700 includes example selected combinations of coupling factors in charts 1701 and graphical representations 1703 of the effect that some selected coupling factors have on circuit component performance. For example, in a delay time analysis, the results for each of the selected combination of coupling factors for the selected circuit components for analysis are displayed in the same color-coded fashion as that included in the charts 1701 so an IC designer can easily recognize the effects a selected coupling factor has on the signal transmitted through the selected circuit component.

Figure 18:
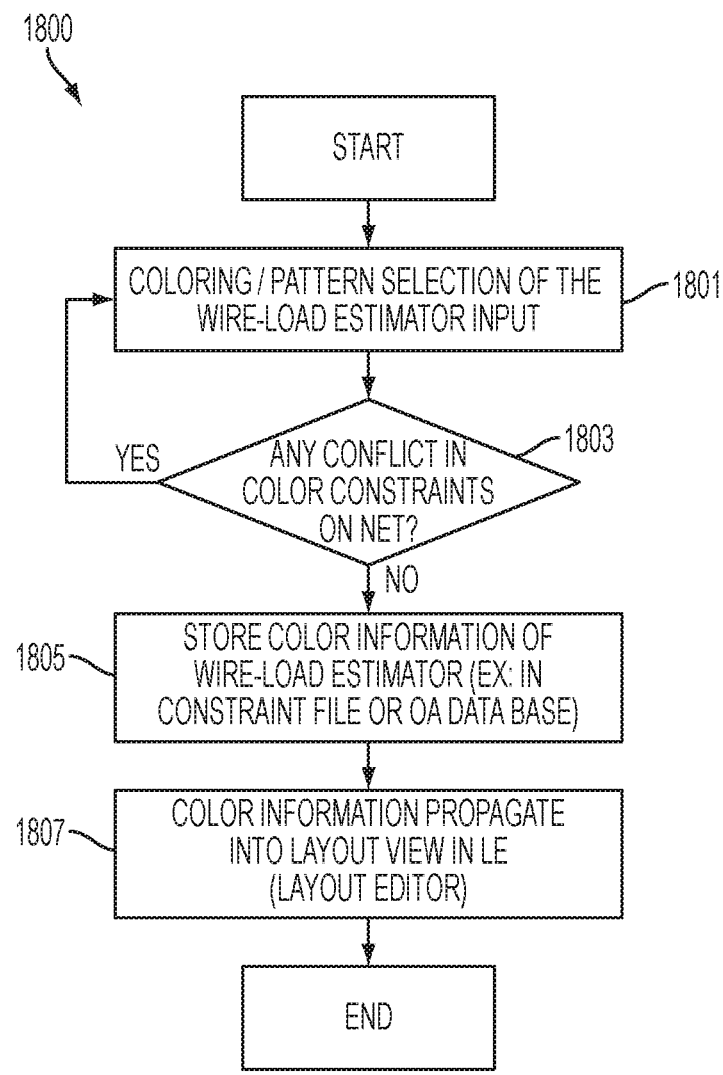
FIG. 18 is a flowchart of a method of generating a color-coded layout with a same color scheme as the schematic, in accordance with one or more embodiments.

FIG. 18 is a flowchart of a method 1800 for generating a layout of a designed IC having the same assigned color scheme as a corresponding color-coded schematic, in accordance with one or more embodiments.

Method 1800 begins with step 1801 in which one or more components in a schematic of the designed IC are selected for placement in a layout of the designed IC. The color scheme of the one or more selected components in the schematic and the pattern of the one or selected components in the schematic are input into the wire-load estimation module 115 of the IC design platform 103 (FIG. 1). In step 1803, the IC design platform 103 determines if there are any conflicts between the assigned color scheme of the one or more selected circuit components in the schematic and any known constraints or design rules stored in the database 107 (FIG. 1). If there are conflicts, then the schematic is to be re-designed and the method returns to step 1801. If no conflicts are determined, the method continues to step 1805 in which the IC design platform 103 stores the non-conflicting color scheme, for example, in a constraints file in the database 107 for later recall. In step 1807, the layout of the designed IC, having passed the conflict check, is produced in a layout editor displayed via user interface 111 (FIG. 1). The layout of the designed IC includes circuit components that are displayed having the same color scheme as that of the corresponding circuit components of the schematic.

Figure 19:
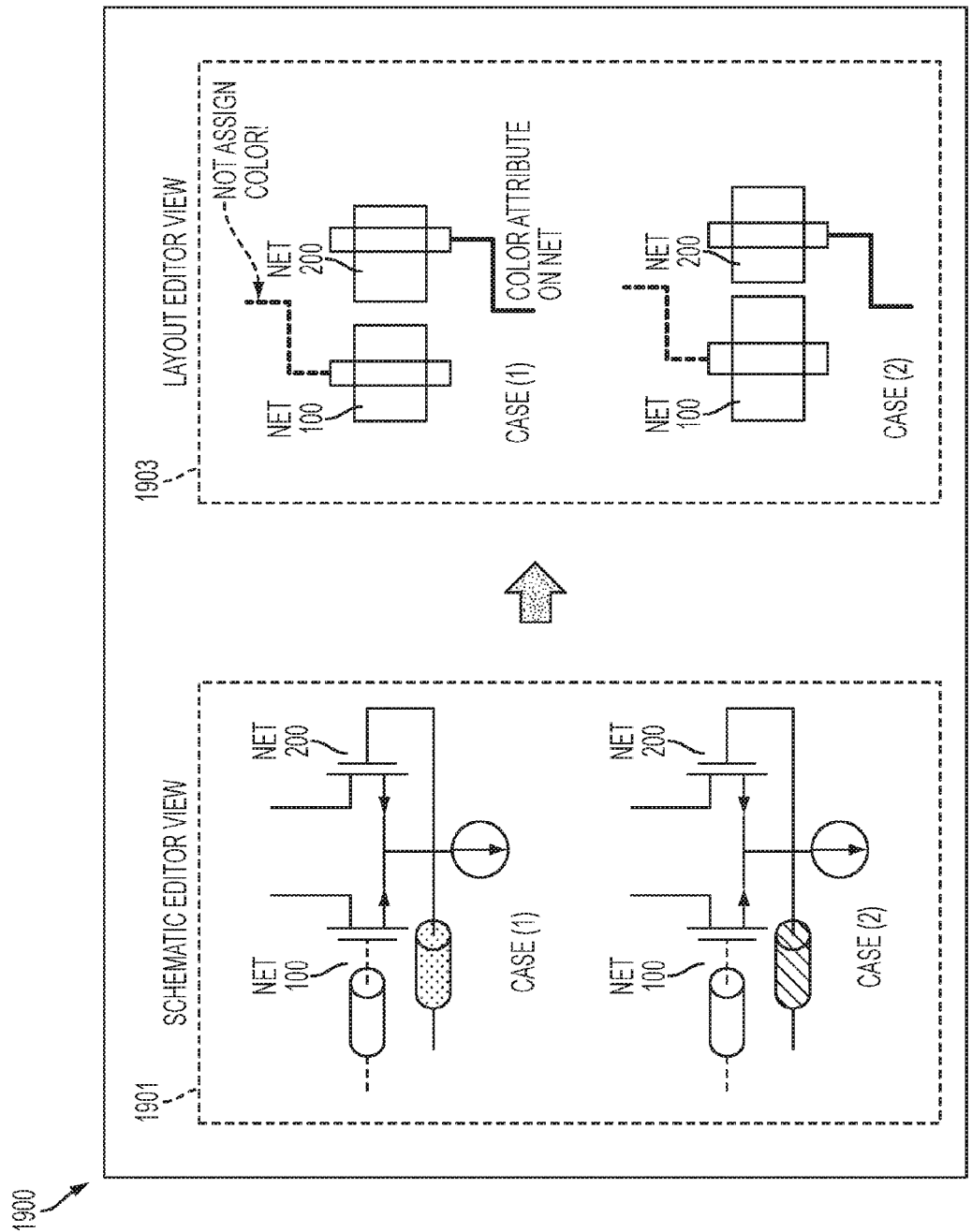
FIG. 19 is a diagram of a user interface that displays a color-coded schematic to color-coded layout conversion, in accordance with one or more embodiments.

FIG. 19 is a diagram of a user interface 1900 showing a schematic to layout conversion of a designed IC, in accordance with one or more embodiments.

User interface 1900 is accessible by way of the user interface 111 (FIG. 1) and includes one or more of a schematic editor view 1901 that displays an editable schematic of the designed IC. IC design platform 103 causes user interface 1900 to be displayed based on a user input indicating that the schematic editor view 1901 and/or a layout editor view 1903 are to be displayed. One or more of the circuit components in the schematic are assigned a color scheme that corresponds to an estimated RC value associated with a selected configuration of the circuit component included in the designed IC and represented in symbolic form in the schematic view editor 1901. The color scheme assigned to the circuit component in the schematic view editor 1901 is also transferred, as discussed, to a layout editor view 1903 in which the circuit component having the selected circuit component configuration and the wire interconnect coupled to the circuit component are displayed having the same color scheme as the circuit component and the wire interconnect represented in the schematic editor view 1901. Any assigned color schemes or constraints on the circuit components included in the designed IC are stored in, for example, a constraints file in the database 107 (FIG. 1) so that when driven to the layout, the color assignment on circuit component can propagate to the layout editor view 1903.

In some embodiments, a routing tool creates inter-connect wires to touch a pin in the layout editor view and the color scheme also propagates to the wire. If the color scheme has a conflict between the stored constraints and the layout view, the conflicting circuit component is highlighted at least in the schematic editor view 1901 and the layout is not generated, or the layout is generated in the layout editor view 1903, the conflict is ignored, but the conflicting circuit component is highlighted by the routing tool to make the conflict easily identifiable for designer correction.

The processes described herein for generating a color-coded schematic of a designed IC, generating a layout of the designed IC, and synchronizing the color scheme assigned to the symbols representing the circuit components in the schematic to the circuit components in the layout of the designed IC such that the circuit components in the schematic and the layout have the same color scheme may be advantageously implemented via software in combination with hardware or firmware, hardware, firmware or a combination of software and firmware and/or hardware. For example, the processes described herein, may be advantageously implemented via a processor, Digital Signal Processing (DSP) chip, an Application Specific Integrated Circuit (ASIC), Field Programmable Gate Arrays FPGAs, etc. Such exemplary hardware for performing the described functions is detailed below.

FIG. 20 is a functional block diagram of a computer or processor-based system 2000 upon which or by which an embodiment is implemented.

Processor-based system 2000 is programmed to generate a color-coded schematic of a designed IC, generate a layout of the designed IC, and synchronize the color scheme assigned to the symbols representing the circuit components in the schematic to the circuit components in the layout of the designed IC such that the circuit components in the schematic and the layout have the same color scheme, as described herein, and includes, for example, bus 2001, processor 2003, and memory 2005 components.

In some embodiments, the processor-based system is implemented as a single "system on a chip." Processor-based system 2000, or a portion thereof, constitutes a mechanism for performing one or more steps of generating a color-coded schematic of a designed IC, generating a layout of the designed IC, and synchronizing the color scheme assigned to the symbols representing the circuit components in the schematic to the circuit components in the layout of the designed IC such that the circuit components in the schematic and the layout have the same color scheme.

In some embodiments, the processor-based system 2000 includes a communication mechanism such as bus 2001 for transferring information and/or instructions among the components of the processor-based system 2000. Processor 2003 is connected to the bus 2001 to obtain instructions for execution and process information stored in, for example, the memory 2005. In some embodiments, the processor 2003 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 2003. Similarly, an ASIC is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 2003 performs a set of operations on information as specified by a set of instructions stored in memory 2005 related to generating a color-coded schematic of a designed IC, generating a layout of the designed IC, and synchronizing the color scheme assigned to the symbols representing the circuit components in the schematic to the circuit components in the layout of the designed IC such that the circuit components in the schematic and the layout have the same color scheme. The execution of the instructions causes the processor to perform specified functions.

The processor 2003 and accompanying components are connected to the memory 2005 via the bus 2001. The memory 2005 includes one or more of dynamic memory (e.g., RAM, magnetic disk, writable optical disk, etc.) and static memory (e.g., ROM, CD-ROM, etc.) for storing executable instructions that when executed perform the steps described herein to generate a color-coded schematic of a designed IC, generate a layout of the designed IC, and synchronize the color scheme assigned to the symbols representing the circuit components in the schematic to the circuit components in the layout of the designed IC such that the circuit components in the schematic and the layout have the same color scheme. The memory 2005 also stores the data associated with or generated by the execution of the steps.

In one or more embodiments, the memory 2005, such as a random access memory (RAM) or any other dynamic storage device, stores information including processor instructions for generating a color-coded schematic of a designed IC, generating a layout of the designed IC, and synchronizing the color scheme assigned to the symbols representing the circuit components in the schematic to the circuit components in the layout of the designed IC such that the circuit components in the schematic and the layout have the same color scheme. Dynamic memory allows information stored therein to be changed by system 100. RAM allows a unit of information stored at a location called a memory address to be stored and retrieved independently of information at neighboring addresses. The memory 2005 is also used by the processor 2003 to store temporary values during execution of processor instructions. In various embodiments, the memory 2005 is a read only memory (ROM) or any other static storage device coupled to the bus 2001 for storing static information, including instructions, that is not changed by the system 100. Some memory is composed of volatile storage that loses the information stored thereon when power is lost. In some embodiments, the memory 2005 is a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 2003, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

Methods and systems described herein provide earlier and more accurate estimation of the layout RC values to enable a designer to complete a high-quality product design faster. For example, for a 10 nm process, full-coloring and RC in-balance of a multi-mask process using the above-discussed methods and tools reduces the gap between pre-simulation and post-simulation stages in IC design. The discussed IC design platform 103 (FIG. 1) having the described wire-load estimation module 115 provides delta R, C, timing delay, rise time, fall time, and power analysis between different coloring patterns such as AAA, BBB, ABA and BAB, or another pattern combination.

The methods and systems described herein make it possible to provide a wire-load RC estimator device in simulation that allows users to input a coloring pattern (ex: AAA, BBB, BAB and ABA), metal layers and physical geometries (width, length and space) as component parameter inputs instead of conventional resistance and capacitance values. Then, using the discussed callback function, the IC design platform 103 automatically calculates RC values from back-end-of-line (BEOL) models having look-up tables and which provide a color-coded schematic that has a translatable color-scheme that describes the estimated RC values for easy analysis and comparison.

Additionally, the methods and systems described herein also make it possible to provide a parameter setting alignment function of single or multiple circuit components at one time through a pre-defined file or memory available by the database 107 (FIG. 1). The methods and systems described also provide a mismatch (%) analysis on wire-load resistance, coupling capacitance and total capacitance in different scenarios—e.g., different coloring pattern assignment, different width, length and space assignment between source components and target components. The methods and systems discussed also compare circuit component electrical analysis results with variations of the same circuit component having different wire-load parameters input. Such comparison includes analysis of timing delay, rise time, fall time, statistic power and dynamic power of the different variations of the circuit component.

In some embodiments, a method comprises generating a schematic of an integrated circuit (IC), the IC having a circuit component. The method also comprises searching a database having one or more configurations of the circuit component, each of the one or more configurations of the circuit component having a corresponding estimated resistance capacitance (RC) value and an assigned color scheme based on the estimated RC value. The method further comprises displaying the circuit component in the schematic as a symbol representing the circuit component, the symbol representing the circuit component being displayed having the assigned color scheme of a selected configuration of the circuit component.

In some embodiments, an apparatus comprises at least one processor and at least one memory including computer program code for one or more programs. The at least one memory and the computer program code are configured to, with the at least one processor, cause the apparatus to, based on input received from a user interface, generate a design of an integrated circuit (IC), the IC having a circuit component. The apparatus is further caused to obtain a plurality of configurations of the circuit component from a database, each configuration of the plurality of configurations having a corresponding estimated resistance capacitance (RC) value and an assigned color scheme based on the estimated RC value. The apparatus is further caused to receive an indication of a selection of a configuration of the plurality of configurations from the user interface and output a schematic of the IC to the user interface, wherein the schematic includes a symbol representing the circuit component and the symbol is output in accordance with the assigned color scheme of the selected configuration.

In some embodiments, a non-transitory computer-readable storage medium carries computer-readable instructions which, when executed by one or more processors, cause an apparatus to receive, from a user interface, an indication of a selection of a circuit component for an integrated circuit (IC) and query a database having a plurality of configurations of the circuit component, each configuration of the plurality of configurations having a corresponding estimated resistance capacitance (RC) value and an assigned color scheme based on the estimated RC value. The apparatus is further caused to, based on an indication of a selection of a configuration of the plurality of configurations, output to the user interface a schematic of the IC, the schematic including a symbol representing the circuit component, wherein the symbol is output in accordance with the assigned color scheme of the selected configuration.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
generating, by a processor, a schematic of an integrated circuit (IC), the IC having a circuit component;
displaying the circuit component in the schematic as a symbol representing the circuit component, the symbol representing the circuit component being displayed having an assigned color scheme of a selected configuration of the circuit component,
aligning the circuit component with a designated target circuit component, the alignment causing a source configuration of the circuit component to match a target configuration of the target circuit component, the target configuration of the target circuit component having a target color scheme based on an estimated resistance capacitance (RC) value of the target circuit component; and changing the symbol representing the circuit component in the schematic to be displayed having the target color scheme.

2. The method of claim 1, wherein the estimated RC value of the target circuit component is based on one or more circuit component parameters, the one or more circuit component parameters comprising one or more of a circuit component pattern structure, a circuit component length, a circuit component width, or a spacing between one or more sub-components of the circuit component.

3. The method of claim 2, further comprising:
storing in a database one or more of the target circuit component, the estimated RC value of the target circuit component, the assigned color scheme of the target circuit component, or the one or more circuit component parameters,
wherein the displaying of the circuit component in the schematic comprises implementing a callback function configured to selectively recall the assigned color scheme from the database.

4. The method of claim 3, further comprising:
determining an RC mismatch degree between an estimated RC value of the circuit component and the estimated RC value of the target circuit component based on RC value data stored in the database; and
displaying the determined RC mismatch degree.

5. The method of claim 4, wherein the determining the RC mismatch degree comprises determining a resistance mismatch percentage and determining a capacitance mismatch percentage.

6. The method of claim 1, further comprising:
displaying one or more additional circuit components in the schematic with a same color scheme as that assigned to the target configuration of the circuit component in the schematic.

7. The method of claim 1, further comprising:
highlighting the circuit component in the schematic if the circuit component conflicts with a constraint or design rule stored in a database.

8. The method of claim 1, further comprising:
selecting the selected configuration of the circuit component based on a display of a color-coded circuit component layout.

9. The method of claim 1, wherein
the designated target circuit component is one target circuit component of a plurality of target circuit components, and
the aligning the circuit component with the designated target circuit component comprises displaying a list of the plurality of target circuit components.

10. An apparatus comprising:
at least one processor; and
at least one memory including computer program code for one or more programs, the at least one memory and the computer program code configured to, with the at least one processor, cause the apparatus to:
output a schematic of an integrated circuit (IC) to a user interface, wherein the schematic includes a symbol representing a circuit component and the symbol is output in accordance with an assigned color scheme of a selected configuration of the circuit component;
based on input received from the user interface, perform an analysis of the circuit component, the analysis being based on the selected configuration of the circuit component and on an alternative configuration of the circuit component; and
output results of the analysis to the user interface, the results being output in accordance with the assigned color scheme.

11. The apparatus of claim 10, wherein the analysis comprises generating an estimated resistance capacitance (RC) value of each configuration of the selected configuration and the alternative configuration based on one or more of a circuit component pattern structure, a circuit component length, a circuit component width, or a spacing between one or more sub-components of the circuit component.

12. The apparatus of claim 11, wherein the apparatus is further caused to:
store in a database one or more of the selected configuration or the alternative configuration, the estimated RC value of each configuration of the selected configuration and the alternative configuration, the assigned color scheme of each configuration of the selected configuration and the alternative configuration, or the one or more of the circuit component pattern structure, the circuit component length, the circuit component width, or the spacing between one or more sub-components of the circuit component.

13. The apparatus of claim 11, wherein
the circuit component is a wire and the estimated RC value of each of the selected configuration and the alternative configuration is determined by a wire-load estimator configured to calculate comparison results comprising delta R, C, timing delay, rise time, fall time, and power analysis values between the selected configuration and the alternative configuration, and
the results of the analysis comprise the comparison results.

14. The apparatus of claim 11, wherein
the analysis further comprises assigning a coupling factor to simulate an effect a signal transmitted through a nearby circuit component has on the estimated RC value of the selected configuration, the assigned coupling factor simulating the effect the signal would have on the estimated RC value of the selected configuration based on whether the signal is in-phase, out-of-phase, or in a steady state with a signal transmitted through the circuit component; and
results of the analysis comprise the coupling factor.

15. The apparatus of claim 14, wherein the apparatus is further caused to receive the coupling factor from the user interface.

16. The apparatus of claim 11, wherein the apparatus is further caused to:
receive the one or more of the circuit component pattern structure, the circuit component length, the circuit component width, or the spacing between one or more sub-components of each configuration of the circuit component from the user interface.

17. The apparatus of claim 10, wherein the apparatus is further caused to:
propagate the assigned color scheme of the selected configuration of the circuit component to a layout editor.

18. A non-transitory computer-readable storage medium carrying computer-readable instructions which, when executed by one or more processors, cause an apparatus to:

receive, from a user interface, an indication of a selection of a circuit component for an integrated circuit (IC), the indication including a color scheme for the circuit component;

determine if a conflict exists between the color scheme and a constraint or design rule stored in a database; and based on a determination that no conflict exists, output to the user interface a layout of the IC, the layout including the circuit component having the color scheme.

19. The non-transitory computer-readable storage medium of claim 18, wherein the computer-readable instructions are configured to further cause the apparatus to:

based on the determination that no conflict exists, output the color scheme of the selected circuit component to the database.

20. The non-transitory computer-readable storage medium of claim 18, wherein the computer-readable instructions are configured to further cause the apparatus to:

based on a determination that a conflict exists, receive another indication of another selection of the same or another circuit component.

\* \* \* \* \*